(12) United States Patent
Hardin et al.

(10) Patent No.: US 9,963,961 B2
(45) Date of Patent: May 8, 2018

(54) AUTOMATED SYSTEM FOR MONITORING AND CONTROLLING WATER TRANSFER DURING HYDRAULIC FRACTURING

(71) Applicant: Data Automated Water Systems, LLC, Coleman, TX (US)

(72) Inventors: Greggory L. Hardin, Coleman, TX (US); Jeffrey S. Russo, Charleston, WV (US)

(73) Assignee: SELECT ENERGY SERVICES, LLC, Gainesville, TX (US)

( * ) Notice: Subject to any disclaimer, the term of this patent is extended or adjusted under 35 U.S.C. 154(b) by 679 days.

(21) Appl. No.: 14/556,096

(22) Filed: Nov. 28, 2014

(65) Prior Publication Data

US 2015/0144336 A1 May 28, 2015

Related U.S. Application Data

(60) Provisional application No. 61/910,037, filed on Nov. 28, 2013.

(51) Int. Cl.
*E21B 43/00* (2006.01)
*E21B 43/26* (2006.01)
(Continued)

(52) U.S. Cl.
CPC ............ *E21B 43/26* (2013.01); *E21B 21/106* (2013.01); *E21B 44/00* (2013.01)

(58) Field of Classification Search
CPC ........ E21B 44/00; E21B 43/26; E21B 21/106; G05D 9/12
See application file for complete search history.

(56) References Cited

U.S. PATENT DOCUMENTS 3,503,411 A * 3/1970 Bauer .................... G05B 19/44
137/101.25
4,180,083 A * 12/1979 Miyaoka ............... H02J 15/003
137/101.25

(Continued)

FOREIGN PATENT DOCUMENTS

WO WO-2013/0707281 5/2013

OTHER PUBLICATIONS

International Search Report issued in PCT/US2014/67830 dated Feb. 25, 2015.
Written Opinion issued in PCT/US2014/67830 dated Feb. 25, 2015.

*Primary Examiner* — Nicole Coy
(74) *Attorney, Agent, or Firm* — Foley & Lardner LLP; Robert Ward, Esq.

(57) ABSTRACT

An exemplary automated system and method are provided for monitoring and controlling the transfer of water to frac water tanks during hydraulic fracturing. In one embodiment, the automated system includes a first manifold, a plurality of controllable valves, a plurality of level indicators, a pump, controller(s), storage device, and display. In one implementation, the controller is configured to control the opening/closing of the plurality of controllable valves based, at least in part, on the water levels of the frac water tanks. The controller(s) may include one or more control modes. In other implementations, the system may include a second manifold (or additional manifolds) and the capability to blend water from two or more sources, such as from an impaired water source, using either a single or multiple-manifold configuration. In other implementations, an assembly is provided, such as a skid or trailer mounted assembly, for use in a mobile automated system.

54 Claims, 7 Drawing Sheets

(51) Int. Cl.
   *E21B 27/00*  (2006.01)
   *E21B 44/00*  (2006.01)
   *E21B 34/00*  (2006.01)
   *E21B 21/10*  (2006.01)

(56) References Cited

U.S. PATENT DOCUMENTS

| | | | | |
|---|---|---|---|---|
| 4,535,851 | A * | 8/1985 | Kirkpatrick | E21B 21/001 175/218 |
| 4,953,618 | A * | 9/1990 | Hamid | E21B 33/068 166/250.01 |
| 2010/0032031 | A1 * | 2/2010 | Neal | E21B 21/02 137/565.01 |
| 2011/0272144 | A1 | 11/2011 | Belcher et al. | |
| 2013/0299167 | A1 | 11/2013 | Fordyce et al. | |
| 2014/0246200 | A1 * | 9/2014 | Warren | A61L 2/10 166/310 |
| 2014/0332451 | A1 * | 11/2014 | Munisteri | B01D 17/0214 210/86 |
| 2015/0059858 | A1 * | 3/2015 | Ellis | B65D 88/54 137/1 |
| 2016/0032703 | A1 * | 2/2016 | Broussard | E21B 43/267 166/250.01 |
| 2016/0123127 | A1 * | 5/2016 | Walls | E21B 21/106 166/244.1 |

* cited by examiner

AUTOMATED SYSTEM FOR MONITORING AND CONTROLLING WATER TRANSFER DURING HYDRAULIC FRACTURING

CROSS-REFERENCE TO RELATED APPLICATIONS

Pursuant to 35 U.S.C. § 119(e), this application claims priority from, and hereby incorporates by reference, for all purposes, U.S. Provisional Patent Application Ser. No. 61/910,037, entitled "AUTOMATED SYSTEM FOR MONITORING AND CONTROLLING WATER TRANSFER DURING HYDRAULIC FRACTURING," filed Nov. 28, 2013 and naming Greggory Lynn Hardin and Jeffrey Scott Russo as inventors.

TECHNICAL FIELD

This disclosure relates in general to water transfer systems and methods and, in particular, but not by way of limitation, to an automated system for monitoring and controlling water transfer for use in a hydraulic fracturing process, including the transfer of both fresh water along with impaired and/or produced water.

BACKGROUND OF THE DISCLOSURE

Hydraulic fracturing has revolutionized the oil and gas industry. The hydraulic fracturing of a geologic formation, such as a geologic formation of an oil/gas well, is also referred to as "fracking," or to "frac" or "frack" a well. This process typically involves the use of a high pressure pump, such as a frac pump, to apply a high pressure fluid mixture of water and a proppant, which is often sand or other a ceramic proppant, along with other chemicals down the wellbore of an oil or gas well to fracture or crack the geologic formation, such as shale, that contains hydrocarbons that may include oil, condensates, gas, or a combination thereof. The proppant, if properly positioned in one of the fractures induced in the geologic formation, is used to hold the fracture open so that hydrocarbons may be released from the formation. Water and sand comprise the vast majority of the fluid used in fracking a well. In some cases, the water and sand may be over ninety-eight percent of the fluid and materials used in fracking a well, with other chemicals making up less than two percent of the total. Depending on various factors, the fracking of a well may involve the use of millions of gallons of water, which serves as the primary carrier fluid during the fracking process. Once the high pressure mixture is removed, the sand or other proppant remains wedged and positioned in the induced cracks, fissures, or fractures of the geologic formation to allow oil and/or gas to flow more freely.

Hydraulic fracturing is not appropriate or effective in all hydrocarbon geologic formations, but has proven to be very effective and economical in improving hydrocarbon production in tight geologic formations, such as shale formations, which include many geologic formations previously thought not to be economical to produce. Hydraulic fracturing has also proven valuable in stimulating the production of hydrocarbons in certain geologic formations that have been substantially depleted of oil and/or gas using conventional oil and gas production and recovery technologies.

During the hydraulic fracturing process, the liquid, which is usually water, must be available in abundant quantities as the high pressure pump(s) are used to mix the water with the other chemicals and the proppant, which is normally a specialized sand or ceramic material referred to as "frac sand". If the frac water is depleted or is not available in sufficient quantities during the high pressure hydraulic fracturing process, the expensive high pressure pumps may be damaged, the geologic formation and wellbore may be irreparably harmed, and/or the fracking process will need to be performed again or may be ineffective. Any of these events, individually or in combination, are extremely costly. Thus, it is imperative that the frac water be available in sufficient quantity at all times when needed during the hydraulic fracturing process.

The frac water is normally provided at a wellbore for the hydraulic fracturing process using numerous water tanker trailers or frac water storage containers that must be refilled or maintained at certain levels during the hydraulic fracturing process. The water is generally provided from surface water sources such as lakes, rivers, streams, ponds, and municipal water supplies. In other arrangements, impaired water may be used as the water source, which serves as the primary carrier fluid. The source water may be provided locally or at some distance from the well site, and may be stored in a local frac water pond, reservoir, or a frac water containment storage tank. The frac water tanker trailers or frac water storage containers/tanks are generally connected to a manifold so that sufficient source water is provided to each such trailer or tank so that the source water is then made available to the high pressure frac pump(s) at the appropriate time during the frac process. The entire hydraulic fracturing process at a particular drilling pad or location may take anywhere from 12 hours to two months, for example, depending on numerous factors such as, for example, the particular geologic formation, depths, well bore, number of stages, number of laterals (if any), and the desired results.

Unfortunately, the important process of monitoring and controlling the numerous water levels in the various frac water tanker trailers and ensuring that water is properly and timely transferred to the various frac water tanker trailers during the hydraulic fracturing process is time consuming, labor intensive, subject to human error, and expensive. Further, if problems occur during the hydraulic fracturing process with, for example, one of the frac water tanker trailers or connections thereto, the entire frac process may have to be stopped or delayed because of the inability to conveniently and accurately divert source water from such a frac water tanker trailer that is experiencing the problem.

SUMMARY

In a first aspect, there is provided an automated system for monitoring and controlling the transfer of water during a hydraulic fracturing process. The automated system may include a first manifold operable to receive water from the first water source through at least one input and to supply water to a plurality of output openings for use in the hydraulic fracturing process, a plurality of controllable valves each configured to be in fluid communication between an input to one of the plurality of frac water storage containers and with one of the plurality of output openings of the first manifold, a plurality of level indicators, wherein each of the plurality of level indicators are configured to one of the plurality of frac water storage containers to determine a water level at each such one of the plurality of frac water storage containers, a first flow meter configured to measure a flow of water into the first manifold, a first pump configured to be remotely operated, to receive water from the first water source, and to pump water through a discharge to the at least one input of the first manifold with the plurality of output openings. The automated system may further include one or more controllers configured to at least partially control the operation of the first pump to allow water to be pumped into the first manifold, and wherein the one or more controllers are in communication with the plurality of controllable valves and configured to control the opening and closing of each of the plurality of controllable valves to a desired opening position so that water from the first water source in the first manifold may be provided to each of the plurality of frac water storage containers through the plurality of output openings of the first manifold based at least partially on the water level of the plurality of frac water storage containers determined by the associated plurality of level indicators, one or more displays are provided that are operable to receive and display information that includes the water level of one or more of the plurality of frac water storage containers as determined at least partially by one or more of the plurality of level indicators, the valve opening positions of one or more of the plurality of controllable valves, the flow of water into the first manifold, and operating information of the first pump. The automated system may also include a storage device configured to receive and store information that includes two or more of the following from the group that includes the water level of one or more of the plurality of frac water storage containers as determined at least partially by one or more of the plurality of level indicators, the water volume level of one or more of the plurality of frac water storage containers as determined at least partially by one or more of the plurality of level indicators, the valve opening positions of one or more of the plurality of controllable valves, operating information of the first pump, and the flow of water into the manifold from the first flow meter.

Such an automated system, in certain embodiments, is reliable, as well as easy to install, setup, maintain, and operate, while reducing overall water transfer expenses as compared to conventional systems and techniques. Further, the automated system provides the capability to store operational data to provide a confirmatory operational data record heretofore unavailable for the frac water transfer process. The automated system reduces the chance of human error, which could result in spills, overflows, empty frac water storage tanks/containers, which may harm or interrupt the frac job, or even result in damage to the well or geologic formation. Further, the superior control and safer operation of the automated system, in certain embodiments, may provide cost savings through the reduction in labor costs and/or through the use of fewer frac water tanks during the frac process.

In certain embodiments, the automated system may include a plurality of water level displays configured to receive and display the water level of one of the plurality of frac water storage containers as determined by a corresponding one of the plurality of level indicators that are each configured relative to one of the plurality of frac water storage containers to determine a water level at such one of the plurality of frac water storage containers.

In other embodiments, the plurality of level indicators are configured relative to one of the plurality of frac water storage containers to determine a water volume present at such one of the plurality of frac water storage containers that are based at least in part on the corresponding water level at each such one of the plurality of frac water storage containers.

In yet another embodiment of the automated system, the controller is further operable to generate a corresponding water volume at each one of the plurality of frac water storage containers based at least in part on the water level as provided by each one of the plurality of level indicators.

In still another embodiment of the automated system, the plurality of frac water storage containers may include a plurality of frac water tanker trailers.

In certain embodiments of the automated system, the first flow meter is a piggable flow meter configured to allow a pig to pass through the first flow meter.

In still other embodiments, the automated system may include a plurality of cameras operable to generate video that can be viewed remotely, the cameras positioned to view one or more from the group that includes one or more of the plurality of controllable valves, one or more of the plurality of level indicators, one or more of the frac water storage containers, the first flow meter, and the first pump. In certain embodiments, the video generated by the one or more cameras may be stored at the storage device or, in other implementations, using a video storage device, and even a remote video storage device or server.

In yet another embodiment, the automated system may include a pig launcher configured to receive a pig and to provide the pig at a launch location that includes one from the group that includes an opening of the first manifold, adjacent the at least one input of the first manifold, and adjacent the first flow meter, and a pig catcher configured to receive the pig after it travels from the pig launcher. In other embodiments, a remotely controlled valve positioned between the pig launcher and the launch location is provided, and wherein the one or more controllers are further operable to control the opening and closing this remotely controlled valve. In one embodiment, the pig catcher is configured to receive the pig after it travels from the pig launcher, through at least the first flow meter, and through at least a portion of a pipe configured to receive water from the discharge of the first pump. In still further embodiments, the pig catcher is configured to receive the pig after it travels from the pig launcher, through at least a portion of the first manifold, and through at least a portion of a pipe configured to receive water from the discharge of the first pump. A remotely controlled valve may be positioned between the pig catcher and the first manifold, and wherein the one or more controllers further operable to control the opening and closing of the remotely controlled valve positioned between the pig catcher and the first manifold.

In yet another embodiment, the automated system may include a second pump configured to be remotely operated, to receive water from the first water source, and to pump water through a discharge of the second pump to the at least one input of the first manifold, and wherein the one or more controllers further operable to control an operation of the second pump to allow water to be pumped to the at least one input of the first manifold. In another embodiment, the first pump and the second pump each receive water from a first water source.

In still another embodiment, the automated system may include a second pump configured to be remotely operated, to receive water from a second water source, and to pump water through a discharge of the second pump to the at least one input of the first manifold, and wherein the one or more controllers further operable to control an operation of the second pump to allow water from the second water source to be pumped to the at least one input of the first manifold. In other embodiments, the first water source includes water, and the second water source includes one or more from the group that includes impaired water, frac flowback water, and production water.

In certain other embodiments of the automated system the storage device is configured to periodically store some or a portion of the received information, and such information forms an historical log of the transfer of water during the hydraulic fracturing process.

In still other embodiments, the automated system may include a second flow meter configured to measure the flow of water from the discharge of the first pump.

In yet another embodiment, the automated system may include a second flow meter positioned adjacent the discharge of the first pump and the discharge of the second pump, and operable to measure the flow of water to the first manifold.

In still another embodiment, the automated system may include an injection port adjacent an opening in the first manifold (or between the discharge of the first pump and the at least an input of the first manifold) and wherein a substance may be injected into the system during the transfer of water during the hydraulic fracturing process, and wherein the substance injected in the injection port may include one or more from the group that includes chlorine dioxide, an anti-corrosive agent, an anti-freeze, an alcohol, a fluid with a freezing point lower than the freezing point of water, a pH controlling agent, and a decontamination agent.

In certain embodiments, the automated system may include a water treatment system positioned between the discharge of the first pump and the manifold (or adjacent or at the manifold), and the water treatment system configured to treat the water before (or while) the water is provided to the manifold and during the transfer of water during the hydraulic fracturing process. In other implementations, the water treatment system includes the use of a substance that includes one or more from the group that includes chlorine dioxide, an anti-corrosive agent, a pH controlling agent, and a decontamination agent.

In certain other embodiments, the automated system may include an air compressor operable to actuate the plurality of controllable valves while the plurality of controllable valves are being remotely controlled. And in other implementations, the air compressor is coupled to the plurality of controllable air valves through a plurality of air lines that include at least one air dryer operable to reduce the amount of water in the plurality of air lines.

In yet another embodiment, the automated system may include a pig launcher with a pig positioned in the pig launcher; and an air compressor operable to generate air pressure to traverse the pig from the pig launcher, through at least a portion of the manifold (or adjacent the manifold), and to a pig catcher.

In certain other embodiments, the automated system may include a second manifold operable to receive water from a second water source through at least one input, and to supply water from the second water source to a plurality of output openings of the second manifold, a second plurality of controllable valves, wherein each of the second plurality of controllable valves are configured to be in fluid communication between an input to one of the plurality of frac water storage containers and with one of the plurality of output openings of the second manifold, a third flow meter configured to measure a flow of water into the second manifold, a second pump configured to be remotely operated, to receive water from the second water source, and to pump water through a discharge to the input of the second manifold with the plurality of output openings of the second manifold, and a fourth flow meter configured to measure the flow of water from the discharge of the second pump. In such an embodiment, the one or more controllers may be further configured to at least partially control the operation of the second pump to allow water from the second water source to be pumped into the second manifold, and wherein the one or more controllers in communication with the second plurality of controllable valves and configured to control the opening and closing of each of the second plurality of controllable valves to a desired opening position so that water from the second water source in the second manifold may be provided to each of the plurality of frac water storage containers through the plurality of output openings of the second manifold based at least partially on the water level of the plurality of frac water storage containers determined by the associated plurality of level indicators. In certain embodiments, the water from the second water source is one or more from the group that includes impaired water, flowback water from a previous hydraulic fracturing process, and production water from an underground geologic formation.

In yet another embodiment, the one or more controllers is implemented as one or more from the group that includes a programmable logic controller, a personal computer, a laptop computer, a notebook computer, a smartphone, and a tablet computer.

In still other embodiments of the automated system the one or more controllers are operable to remotely control a valve opening position of one or more of the plurality of controllable valves based on one or more of the water levels (whether height or volume corresponding to the water level) in one or more of the plurality of frac water storage containers.

In certain embodiments of the automated system, the one or more controllers are operable to remotely control a valve opening position of the plurality of controllable valves based on a setpoint that is a desired water level in the plurality of frac water storage containers as determined by the plurality of level indicators. In certain configurations, the desired water level is expressed as a volume.

In certain other embodiments of the automated system, the one or more controllers are operable to remotely control a valve opening position of a first one of the plurality of controllable valves based on a first setpoint of the water level in a first one of the plurality of frac water storage containers that is in fluid communication with the first one of the plurality of controllable valves, and wherein the one or more controllers are operable to remotely control a valve opening position of a second one of the plurality of controllable valves based on a second setpoint of the water level in a second one of the plurality of frac water storage containers that is in fluid communication with the second one of the plurality of controllable valves. In one embodiment, the first setpoint and the second setpoint are different.

In certain embodiments of the automated system, the one or more controllers are operable to remotely set a valve opening position of one or more of the plurality of controllable valves to a desired opening, which may be referred to as manually setting the valve opening (although it may be done remotely in certain embodiments) to a desired valve opening where it will stay until changed by the operator. In other embodiments, even though a valve opening is manually set, if a frac storage container overflow condition arises, the "manually" set valve may be automatically closed based on the overflow condition.

In still other embodiments of the automated system, the one or more controllers in communication with a second flow meter to receive the flow of water from the discharge of the first pump, and a fourth flow meter to receive the flow of water from the discharge of the second pump, and wherein the storage device is further configured to receive and store information that includes the flow of water from the discharge of the first pump and the flow of water from the discharge of the second pump.

In another embodiment, a second pump is provided that is configured to be remotely turned on and off, to receive water from a second water source, and to pump water through a discharge to the first water source, and a third flow meter is provided that is operable to measure the flow of water from the discharge of the second pump, and wherein the storage device is further configured to receive and store information that includes the flow of water from the discharge of the second pump that corresponds to the water provided from the second water source to the first water source.

In yet another embodiment, the plurality of frac water storage containers are in fluid communication with one another. In other embodiments, they are not in fluid communication with one another.

In another embodiment, the one or more controllers are configured to generate an alarm if certain predetermined values are met from the data that includes one or more from the group that includes a line pressure related to the first manifold, the flow of water into the first manifold, and the water level in one or more of the plurality of frac water storage containers, and wherein the alarm includes one or more from the group that includes an audible alarm, a blinking display, and a color change on the display.

In still another embodiment, the one or more controllers of the automated system is configured to be remotely accessed through one or more of the group that includes the Internet, a data network, a virtual private network, a wired network, a wireless network, a secure data network, and a satellite communications network.

In one embodiment of the automated system, one or more sensors are provided that are operable to access the water and to measure one or more values from the group that includes a water pressure, line pressure, a pH, a temperature, a frac water storage container pressure, a frac water storage container pH, and a frac water storage container temperature, and wherein the one or more controllers operable to receive such values and display at the one or more displays, and to store at the storage device.

In a second aspect, embodiments are disclosed of an implementation of the automated system in a mobile container for use in an automated system for monitoring and controlling the transfer of water during a hydraulic fracturing process. In one such embodiment, the automated system implemented in a mobile container for monitoring and controlling the transfer of water from a first water source and water from a second water source to a plurality of frac water storage containers is provided for use during a hydraulic fracturing process. The automated system may include a first manifold configured to receive water from the first water source through at least one input, and to supply water to a plurality of output openings for use in the hydraulic fracturing process, a plurality of controllable valves, wherein each of the plurality of controllable valves configured to be in fluid communication between an input to one of the plurality of frac water storage containers and with one of the plurality of output openings of the first manifold, a second manifold operable to receive water from the second water source through at least one input, and to supply water from the second water source to a plurality of output openings of the second manifold, a second plurality of controllable valves, wherein each of the second plurality of controllable valves configured to be in fluid communication between an input to one of the plurality of frac water storage containers and with one of the plurality of output openings of the second manifold, and one or more controllers configured to at least partially control the operation of at least a first pump to allow water from the first water source to be pumped into the first manifold, and wherein the one or more controllers in communication with the plurality of controllable valves and configured to control the opening and closing of each of the plurality of controllable valves to a desired opening position so that water from the first water source in the first manifold may be provided to each of the plurality of frac water storage containers through the plurality of output openings of the first manifold based at least partially on a water level of the plurality of frac water storage containers determined by an associated plurality of level indicators, wherein the one or more controllers further configured to at least partially control the operation of a second pump to allow water from the second water source to be pumped into the second manifold, and wherein the one or more controllers in communication with the second plurality of controllable valves and configured to control the opening and closing of each of the second plurality of controllable valves to a desired opening position so that water from the second water source in the second manifold may be provided to each of the plurality of frac water storage containers through the plurality of output openings of the second manifold based at least partially on the water level of the plurality of frac water storage containers determined by the associated plurality of level indicators. The automated system, in this embodiment, may further include one or more displays operable to receive and display information that includes the water level of one or more of the plurality of frac water storage containers as determined at least partially by one or more of the plurality of level indicators, the valve opening positions of one or more of the plurality of controllable valves and one or more of the second plurality of controllable valves, the flow of water into the first manifold, the flow of water into the second manifold, and operating information of the first pump and the second pump, and a storage device configured to receive and store information that includes two or more of the following from the group that includes the water level of one or more of the plurality of frac water storage containers, the water volume level of one or more of the plurality of frac water storage containers, the valve opening positions of one or more of the plurality of controllable valves and one or more of the second plurality of controllable valves, operating information of the first pump, operating information of the second pump, and the flow of water into the first manifold and the second manifold.

In another embodiment, the automated system implemented in a mobile is one from the group that includes an open trailer, a skid configured to reside on a trailer, a shipping container, a cargo trailer, and an environmentally controlled at least partially closed trailer.

In yet another embodiment, the automated system further includes an air compressor operable to open and close the plurality of controllable valves and the second plurality of controllable valves during the hydraulic fracturing process, and a generator operable to provide power to one or more of the one or more controllers, one or more displays, the storage device, the plurality of controllable valves, and the second plurality of controllable valves.

In still yet another embodiment, the plurality of controllable valves and the second plurality of controllable valves of the automated system implemented in a mobile container include one or more from the group that includes an air controlled valve, a pneumatically controlled valve, and an electrical actuator controlled valve.

In a third aspect, there is provided a method of operating an automated system for monitoring and controlling the transfer of water during a hydraulic fracturing process, wherein the automated system for monitoring and controlling the transfer of water during a hydraulic fracturing process includes one or more of the automated systems and assemblies previously described, and the method includes placing one or more of the plurality of controllable valves into a control mode to control the openings of such controllable valves based at least partially on the water level of the plurality of frac water storage containers, and the control mode includes a control mode from the group that includes an automatic mode, a manual mode, a gang control mode, an individual control mode, and a remote manual control mode. This method may provide both ease of operation and more reliable water transfer, and, in certain implementation, a safer operation.

In certain embodiments of the method, the gang control mode includes a single setpoint for all of the one or more of the plurality of controllable valves in the gang control mode, and the single setpoint is related to a water level in the corresponding frac water storage containers associated with each one or more of the plurality of controllable valves, wherein the individual control mode includes a setpoint for each one of the one or more of plurality of controllable valves in the individual control mode, and the setpoint for each one of the one or more of plurality of controllable valves in the individual control mode related to a water level in a corresponding frac water storage containers associated with each one of the one or more of the plurality of controllable valves, and wherein the remote manual control mode allows one or more of the plurality of controllable valves to be remotely opened to a desired opening to allow water to flow to a corresponding water storage container associated with each one of the one or more of the plurality of controllable valves.

In certain other embodiments of the method, a first one or more of the plurality of controllable valves are in a first control mode, and a second one or more of the plurality of controllable valves are in a second control mode.

In still other embodiments of the method, the automated system for monitoring and controlling the transfer of water during the hydraulic fracturing process further includes a second flow meter configured to measure the flow of water from the discharge of the first pump, a second manifold operable to receive water from a second water source through at least one input, and to supply water from the second water source to a plurality of output openings of the second manifold, a second plurality of controllable valves, wherein each of the second plurality of controllable valves configured to be in fluid communication between an input to one of the plurality of frac water storage containers and with one of the plurality of output openings of the second manifold, a third flow meter configured to measure a flow of water into the second manifold, a second pump configured to be remotely operated, to receive water from the second water source, and to pump water through a discharge to the input of the second manifold with the plurality of output openings of the second manifold, a fourth flow meter configured to measure the flow of water from the discharge of the second pump, and wherein the one or more controllers are further configured to at least partially control the operation of the second pump to allow water from the second water source to be pumped into the second manifold, and wherein the one or more controllers in communication with the second plurality of controllable valves and configured to control the opening and closing of each of the second plurality of controllable valves to a desired opening position so that water from the second water source in the second manifold may be provided to each of the plurality of frac water storage containers through the plurality of output openings of the second manifold based at least partially on the water level of the plurality of frac water storage containers determined by the associated plurality of level indicators. This embodiment of the method may provide the capability to blend more than one source of water, including impaired, flowback, or production water, for example. Such a method of operating such an automated system may include placing all or some of the plurality of controllable valves into an automatic mode or a manual mode to provide water from the first water source to the plurality of frac water storage containers, and placing all or some of the second plurality of controllable valves into an automatic mode or a manual mode to provide water from the second water source to the plurality of frac water storage containers.

In yet another embodiment of the method of blending two or more water sources during the hydraulic fracturing process, the flow rate of the water from the first water source may be remotely adjusted by adjusting an rpm level of the first pump by selecting the desired rpm level using the one or more displays and the one or more controllers, the flow rate of the water from the second water source may be remotely adjusted by adjusting an rpm level of the second pump by selecting the desired rpm level using the one or more displays and the one or more controllers, and wherein the water from the second water source includes one or more from the group that includes impaired water, frac flowback water, and production water.

In another embodiment of the method of operating the automated system, such a process may include remotely closing the plurality of controllable valves and the second plurality of controllable valves using a kill switch by selecting the kill switch displayed on the one or more displays by the one or more controllers. In other embodiments, the method may include shutting all controllable valves when an overflow condition occurs at one of the plurality of frac water storage containers.

In still yet another embodiment of the method, the process may include periodically storing information using the storage device while operating the automated system for monitoring and controlling the transfer of water during the hydraulic fracturing process, wherein the information includes one or more of the group that includes the valve position of one or more of the plurality of controllable valves, the valve position of one or more of the second plurality of controllable valves, the water levels in the frac water storage containers, the volume water provided from the first water source, the volume of water provided from the second water source, operational information associated with the first pump, and operational information associated with the second pump. This provides an historical log or record of the flow of water from each source and the flow of water to the frac water storage containers, which may be invaluable in the event of an audit or issue regarding the frac process.

In another embodiment of the method, the process may include generating an alarm using the one or more controllers based on information while operating the automated system for monitoring and controlling the transfer of water during the hydraulic fracturing process, wherein the information includes one or more of the group that includes the valve position of one or more of the plurality of controllable valves, the valve position of one or more of the second plurality of controllable valves, the water levels in the frac water storage containers, the flow rate of water provided from the first water source, the flow rate of water provided from the second water source, the volume of water provided from the first water source, the volume of water provided from the second water source, operational information associated with the first pump, and operational information associated with the second pump.

In still another embodiment of the method, the process may include remotely accessing the one or more controllers through one or more of the group that includes the Internet, a data network, a virtual private network, a wired network, a wireless network, a secure data network, and a satellite communications network.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
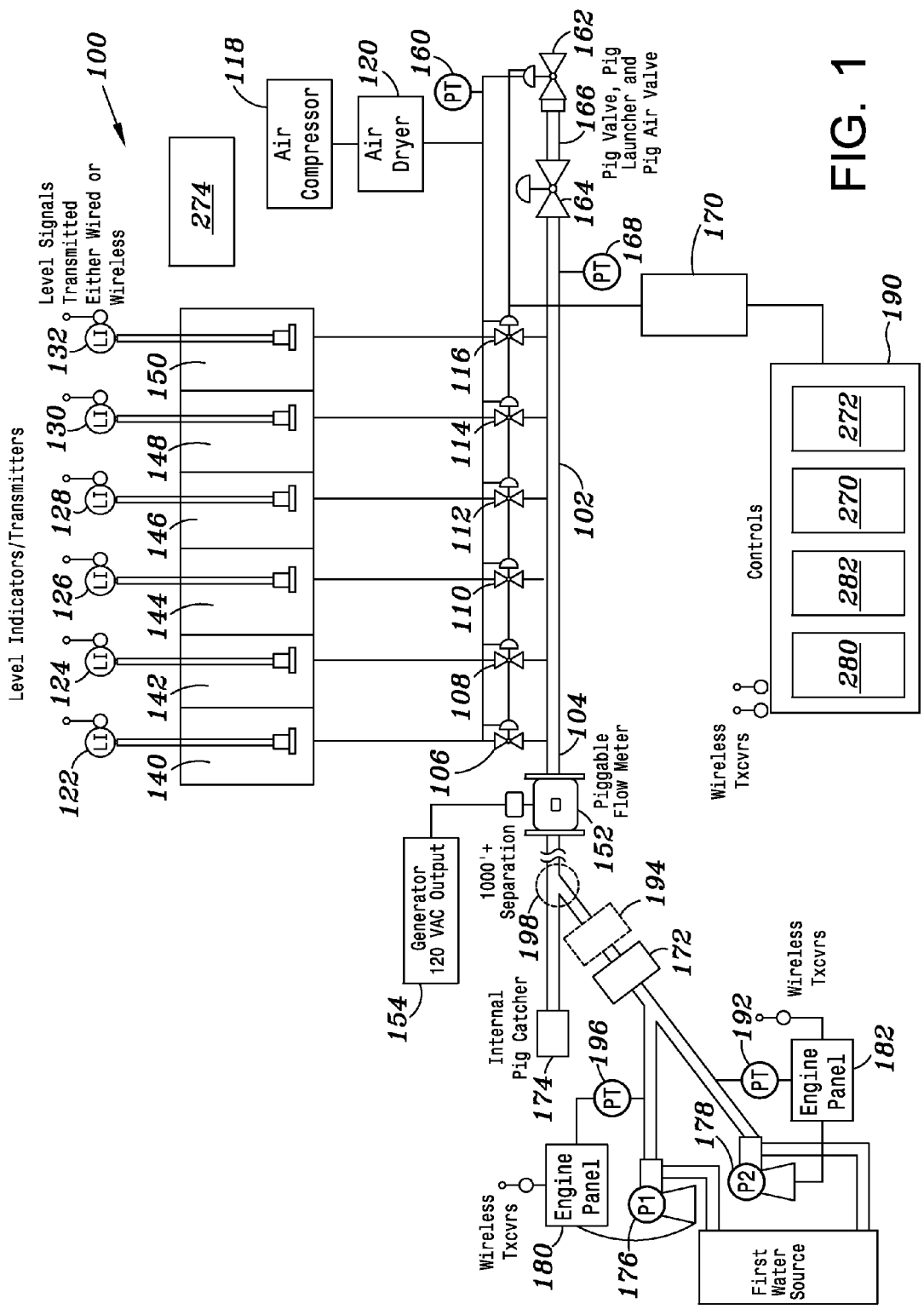
FIG. 1 is a block diagram, schematic representation of an automated system for monitoring and controlling the transfer of water during a hydraulic fracturing process according to an implementation.

FIG. 1 is a block diagram, schematic representation of an automated system 100 for monitoring and controlling the transfer of water during a hydraulic fracturing process, according to one implementation. The automated system 100 includes a manifold 102 with at least one input opening 104 where water is provided to the manifold 102, and a plurality of output openings shown in fluid communication with a plurality of controllable valves 106, 108, 110, 112, 114, and 116, so that water may be provided from the manifold via each of the plurality of output openings to the plurality of controllable valves 106-116. The water may then be provided to a plurality of frac water storage containers 140, 142, 144, 146, 148, and 150, according to one embodiment, with each of the plurality of controllable valves 106-116 opening to a desired opening position to control the amount of water provided to each of a corresponding one of the frac water storage containers 140-150, which may also be implemented using virtually any available containers or tanks, such as, for example, frac water tanker trailers. These frac water tanker trailers may, in one implementation, include a capacity to hold around 500 barrels of water. In one implementation, the water provided to the opening 104 of the manifold 102 may be provided at a rate of 80 barrels per minute, while each of the plurality of controllable valves 106-116 may each provide water, on average, at a rate of 8 barrels per minute to their respective corresponding one of the plurality of frac water storage containers 140-150.

Each of the plurality of controllable valves 106-116 of the automated system 100 may be controlled using a controller 280 (which may be implemented as one or more controllers using any suitable computer or processing device), which receives the level or volume of water from each of the frac water storage containers 140-150 from a plurality of level indicators 122-132 positioned in or adjacent each of the corresponding frac water storage containers 140-150, so that a desired water level or volume is maintained in each of the frac water storage containers 140-150. The plurality of level indicators includes a level indicator 122, 124, 126, 128, 130, and 132, and may use any known or available technology for measuring the level or volume of water or fluid in a container or tank. In one embodiment of the automated system 100, the plurality of level indicators include circuitry or controls to provide their level readings to the controller 280 via a wired or wireless link, such as that illustrated by the antennas adjacent the plurality of level indicators as shown in FIG. 1.

The controller 280 may reside locally or at a second location, such as in a mobile control trailer 190, along with a display 282, which may be implemented as a touchscreen display or any known or available display technology, a storage device 270, such as a hard disk drive, memory card, solid state storage device, optical storage, or any known or available memory or data storage medium. The controller 280 is configured, in one implementation, to periodically store operational readings of the automated system 100 to the storage device 270 to generate a historical log or operations database of the activity of the automated system 100. This may include data wirelessly telemetered, or provided through a network or wired connection, and which may be displayed on one or more screens of the display 282. The data may include the flow of water into the input opening 104 of the manifold 102 as determined by a flow meter, such as a piggable flow meter 152, the levels of each of the plurality of frac water storage containers 140-150 as determined by the plurality of level indicators 122-132, the valve positions of each of the plurality of controllable valves 106-116, the flow of water from the water source as provided at the discharge of one or more pumps as described below, as well as pump engine operational data, and the like. In one implementation, the entire transfer of water may be accounted for using the historical log of the storage device 270 by comparing the water flowing into the automated system 100 with the water leaving the system and deposited or provided to the plurality of frac water storage containers 140-150 using the plurality of controllable valves 106-116.

Figure 2:
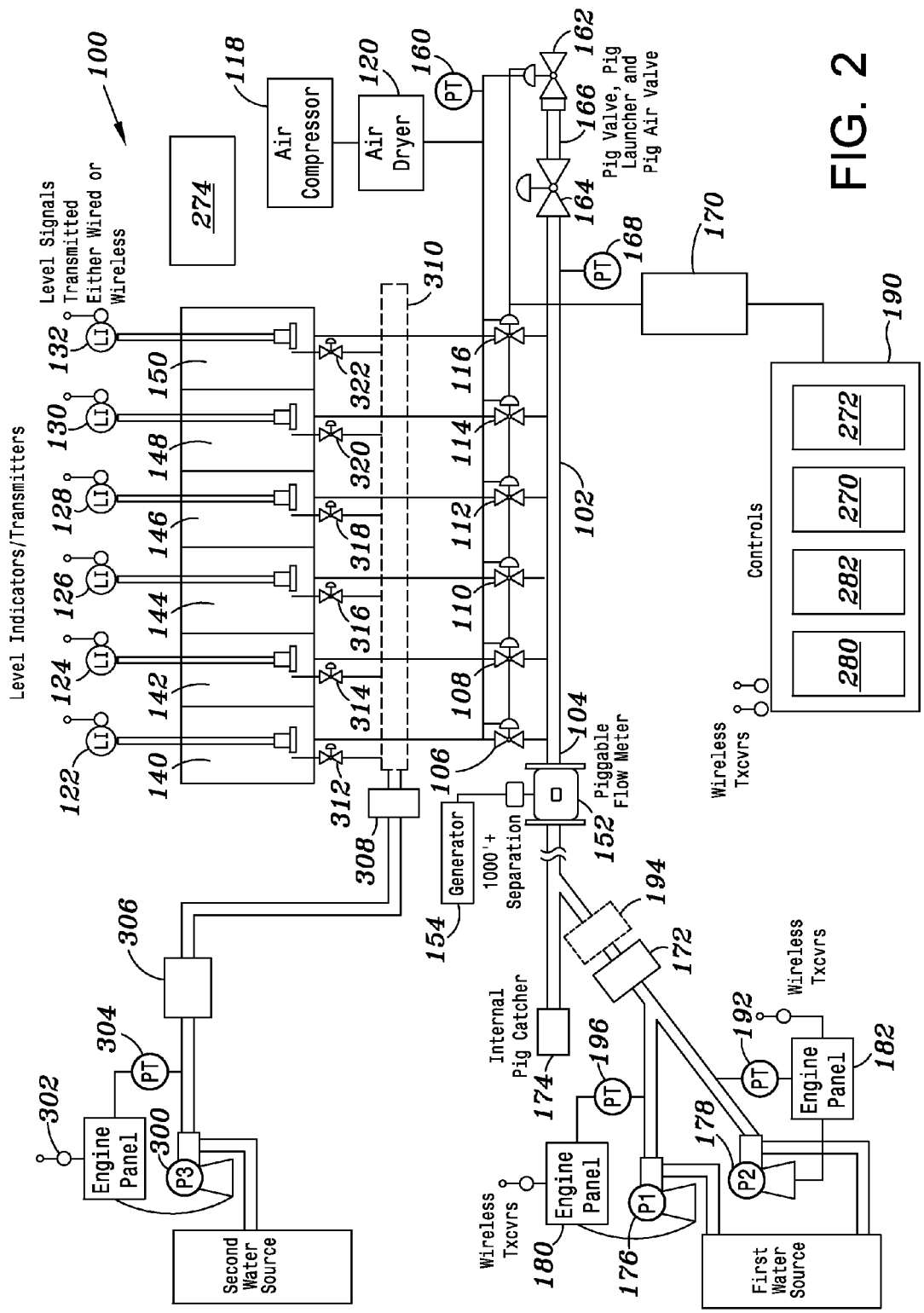
FIG. 2 is a block diagram, schematic representation of an automated system for monitoring and controlling the transfer of water during a hydraulic fracturing process similar to FIG. 1 that includes the capability to blend water from two or more water sources, such as an impaired water source, according to another implementation with a second manifold.

In one embodiment of the automated system 100, video cameras may be placed adjacent certain critical areas or desired locations, and this video information may be provided to the controller 280 or used in a separate system, such as a closed circuit television system, and displayed at a camera display 272. In another embodiment of the automated system 100, a plurality of cameras 274 are provided at locations throughout the automated system 100. The capability of an operator of the automated system 100 positioned at the mobile command center 190 to remotely view various components of the automated system 100 may be important to certain operators and, in certain implementations, provide an additional check or verification to the operator of the operational data of the automated system 100. The mobile command center 190 may be implemented in a trailer along with the manifold 102 (and a second manifold 310 as shown in FIG. 2), along with the various controllable valves 106-116.

The video from the plurality of cameras 274 may be stored using a storage device, such as the storage device 270, a dedicated optical drive, one or more hard drives, or any available device for video storage. In certain implementations, the plurality of cameras 274 may be implemented using IP cameras, which may be accessible through a data network, such as the Internet, an intranet, a VPN, or other available network. In this arrangement, the plurality of cameras 274 may be remotely viewable virtually anywhere using a password protected connection, in a preferred embodiment, and the video may be stored at a local and/or remote video storage device or server.

The various cameras of the plurality of cameras 274 may be placed wherever desired in connection with the automated system 100, such as above one or all of the plurality of water containers 140-150 to view water levels, adjacent the plurality of controllable valves 106-116, where the opening position of each valve may be viewed, the piggable flow meter 152 to view a metered flow rate at the flow meter 152, adjacent an engine or control panel associated with one or more pumps, as well as a display of tank levels that may be provided adjacent the plurality of level indicators 122-132.

The controller 280, in one embodiment, is configured to control the openings of each of the plurality of controllable valves 106-116 by using one or more of a plurality of control modes. In one embodiment, a control mode may be referred to as a gang mode, such that a single setpoint is provided to a desired water level for each of the plurality of frac water storage containers 140-150 to maintain. In response, each of the controllable valves is opened and closed to reach and/or maintain the desired water level in each of the plurality of frac water storage containers 140-150. In another mode, a setpoint is provided to control each of the plurality of controllable valves 106-116 that may be the same or different for each of the plurality of controllable valves 106-116. This may be referred to as an individual control mode. In another mode, which may be referred to as a remote manual control mode, the operator simply sets a desired opening for one or more of the plurality of controllable valves 106-116, where that opening position is maintained until the operator changes the opening position.

The automated system 100 may also include a first pump 176 to provide water from a first water source, which may include, without limitation, a fresh water source, or an impaired water source, such as flowback water contained from a prior frac process, or production water. In alternative embodiments, a second pump 178 is provided that may serve as a backup or hot standby to the first pump 176, operate in parallel with the first pump 176, and/or serve as a pump for a second water source, such as that shown in connection with FIG. 2. The automated system 100 may include a flow meter 172 at the discharge of the first pump 176 and/or the second pump 178, depending on how the flow meter 172 is positioned or configured. The flow meter 172 may provide its flow rate readings to the controller 280, where such flow rates may be logged and monitored as desired. The display 282 may include a pump icon or listing showing the real-time readings from the flow meter 172, which will preferably also be provided in connection with the flow rate values provided to the controller 280 from the piggable flow meter 152.

A communications link between the controller 280 and the engine panels 180 and 182 of the first pump 176 and the second pump 178, the flow meter 172 may be provided using any known or available wireless and/or wired communications channel, link, or path. In a preferred implementation, a wireless connection will be provided because of the often significant distance between the controller 280, such as when located at the mobile control trailer 190, and the first pump 176, the second pump 178, and the flow meter 172.

In one implementation, controllable valves, which may be remotely opened and closed using the controller 280, are provided at each leg of the "Y" connection 198 as shown by the dashed circle in FIG. 1. Such remotely controlled valves may be adjacent one another or separated by some distance. In such a configuration, the remotely controlled valves can be opened and closed to achieve three operational modes that include: (i) a normal or regular mode where water flows from the first water source, through either the first pump 176 or the second pump 178, from the discharge of either the first pump 176 or the second pump 178, and through the piggable flow meter 152 to the opening 104 of the manifold 102; (ii) a recirculation or "recirc" mode where water flows from the first water source to either the first pump 176 or the second pump 178, from the discharge of either the first pump 176 or the second pump 178, and then back to the first water source (and through the pig catcher 174 when such is implemented in the automated system 100); and (iii) the pigging mode where water (and any other liquids), are pushed through the manifold 102 and the connecting line to the "Y" connection 198 to the first water source (and the pig is caught at the pig catcher 174 when such is implemented in the automated system 100). As indicated by their names, the normal or regular mode of the three remotely controlled valves is used during the hydraulic frac process, the recirc mode is used when getting ready for the frac process, to prevent freezing during cold weather conditions, or when working on a problem or situation at or near the manifold, and the pigging mode is used after the frac process has been completed and when water and liquids need to be removed from the manifold 102 and the connecting line to the "Y" connection

198. In a preferred implementation, the control of these three valves provided at each leg of the "Y" connection 198 may be achieved using a wireless communication channel to provide control communication with the controller 280.

The automated system 100 receives water at the first pump 176 and/or the second pump 178 and provides this water to a plurality of frac water storage containers, such as frac water tank trailers. As discussed above, the plurality of frac water storage containers are shown in FIG. 1, and include the frac water storage containers 140 through 150. During the hydraulic fracturing process, which also may be referred to as a frac or fracking process, water must be readily available from the plurality of frac water storage containers 140 through 150. Although not shown in FIG. 1, the plurality of water storage tanks 140-150 may be in fluid communication with one another or may be fluid independent of one another. In one embodiment, the water storage container, such as the water storage container 140, may include a max capacity of 500 barrels. Also not shown in FIG. 1 is an output manifold or a connection of outputs of the frac water storage containers 140-150. At this output manifold or collection of outputs, the water is provided for use in the frac process, which can quickly draw down the water levels in the plurality of frac water storage containers 140-150. Although six frac water storage containers are shown in FIG. 1, it should be understood that any number or size of frac water storage containers may be used, depending on the needed or desired water flows for the hydraulic frac process.

A plurality of level indicators, such as the level indicator 122, the level indicator 124, the level indicator 126, the level indicator 128, the level indicator 130, and the level indicator 132, are shown in FIG. 1. These level indicators may use any known or available technology or technique to determine the current level of water or fluid in their respective water storage container. For example, the level indicator 122 is shown positioned adjacent the water storage container 140 to monitor and determine the level of the water in the water storage container 140. The level indicator 122 may use a sensor, pressure gauge, ultrasonic, float, or a member that reaches for its position within the water storage container 140 to determine the level of the water within the water storage container 140. In one embodiment, a display is provided adjacent or at the water storage container 140 so that an operator may visually see at any given moment what the water level is within the corresponding water storage container. In another embodiment, the level of the water in each water storage container is provided via wireless (or wired) connection with or to the controller 280, which is shown located at the mobile storage trailer 190. In one implementation, the level indicators include processing circuitry to convert the level or depth of the water or fluid within the water storage container, such as the water storage container 150, to a volume, such as the number of barrels within the water storage container 150. In other embodiments, the level indicators 122-132 transmit a depth or level of the water or fluid within their corresponding frac water storage containers to the controller 280 at the mobile control trailer 190. The controller 280 then converts these measurements or readings into a corresponding volume, such as the number of barrels of water within the water storage container. In certain embodiments, such frac water storage containers are considered part of the automated system 100, while in other implementations they are not. In certain implementations, fewer or more frac water storage containers are used, primarily depending on the size of the hydraulic fracturing process and the required amount of water. In other implementations, the frac water storage containers themselves may not be considered as part of the automated system 100.

The first pump 176, which may be powered by an engine, such as a diesel engine, pumps water received from a first water source, not shown in FIG. 1, to a discharge. A pressure sensor/transducer or pressure transmitter 196 is shown at the discharge of the first pump 176 to measure and provide the discharge pressure of the first pump 176. An engine, such as a diesel engine, not shown in FIG. 1, may be implemented to power the first pump 176. An engine panel 180 is shown, along with a wireless transceiver, and is used to control the operation of the first pump 176. For example, the engine panel 180 may be used to power on and off the first pump 176 as well as check/control various operational conditions as well as set an RPM level for the first pump 176. The engine panel 180 along with the wireless transceiver allows the first pump 176 to be remotely controlled, and allows the controller 280 to be used to control or manually remotely control the operation of the first pump 176 and the second pump 178, which is controlled through an engine panel 182. A pressure sensor/transducer or pressure transmitter 192 is shown at the discharge of the second pump 178 to measure and provide the discharge pressure of the second pump 178.

The water fluid from a discharge of the first pump 176 is then provided, in one implementation, to a flow meter at or adjacent the discharge of the first pump 176. The flow rate may be as desired, such as, for example, 80 barrels per minute. In other embodiments, the second pump 178 may be operating in tandem or as a backup to the first pump 176, and the flow meter 172 may be used to measure the discharge of one or both of the first pump 176 and the second pump 178.

As the water flows towards the input opening 104 of the manifold 102, in certain implementations, a water treatment system or apparatus 194 may be provided for the inline, real-time treatment of the water as it flows from the first water source for use as part of the fracking process. Depending on the technology used, any of a variety of treatment systems may be implemented. For example, the water treatment system 194 may be a mobile chlorine dioxide production system to generate chlorine dioxide to treat the water flowing through the automated system 100. In other implementations, an injection port or opening may be utilized so that other substances may be provided to the flow of water within the automated system 100. For example, the water treatment system or apparatus 194 may involve the injection of an anti-corrosive agent, an anti-freeze, an alcohol, a fluid with a freezing point lower than the freezing point of water, a pH controlling agent, and, in other implementations, a decontamination agent. In other implementations, the water treatment system 194 may be provided adjacent or implemented as an opening or port of the manifold 102, where an anti-freeze or other substance may be provided to treat the water and/or lower the freezing point of the water solution to reduce or eliminate possible freezing in cold weather climates.

The automated system 100, in the implementation of FIG. 1, further includes the piggable flow meter 152, that is preferably provided at an input to or adjacent the manifold 102. The distance between the water source and the input 104 of the manifold 102 may vary depending on the particular hydraulic fracturing location. This may be, in some implementations, thousands of feet or even miles in distance, or in other implementations, several hundred yards or closer. The flow of the water into the input opening 104 of the manifold 102 may be remotely monitored using the piggable flow meter 152. In other embodiments, the pig launcher is provided prior to the input to the manifold 102, either before or after the flow meter 152.

The flow meter 152 is a piggable flow meter, in this embodiment, so that a pig may be run from a pig launcher 166, through the manifold 102, through the piggable flow meter 152, and to a pig catcher 174. In other implementations, the pig catcher 174 allows the water and liquids pushed by the pig to be discharged back to the first water source or to another location. In still other implementations, the pig catcher 174 is not used and the pig pushes the water and liquid to the first water location (or other location), where the pig is also retrieved. The pigging process is typically done after the hydraulic fracturing process has been completed or during a delay in the hydraulic fracturing process. In cold weather environments, it may become critical that water and other fluids are removed from the automated system 100 to prevent freezing or ice forming within the system.

During a hydraulic fracturing operation, the water flows into the input opening 104 and through one or more of the plurality of controllable valves, which are shown in FIG. 1 as the controllable valves 106-116, as discussed above. In a preferred embodiment, at least one controllable valve is provided between the manifold 102 and each corresponding frac water storage container, which may also be referred to as a frac water trailer. For example, the controllable valve 106 is associated with the water storage container 140 and is provided in fluid communication with an output of the manifold 102 and an input to the water storage container 140. Thus, the controllable valve 106 is used to control the amount of water provided to the water storage container 140 during the frac process. This same setup is also provided in connection with the controllable valve 108 as it relates to the water storage container 142, the controllable valve 110 as it relates to water storage container 144, controllable valve 112 and water storage container 146, controllable valve 114 and water storage container 148, and controllable valve 116 and water storage container 150. Of course, and as previously mentioned, depending on the required amount/rate of water for the frac process, the number of control valves and associated frac water storage containers may be increased or decreased from what is shown in FIG. 1.

The plurality of controllable valves 106-116 may be implemented using any known or available controllable valves. In a preferred embodiment, an air compressor 118 is provided and pneumatic hoses, such as air hoses, are connected to each of the plurality of controllable valves. The air compressor 118 provides the force necessary to open and close each of the plurality of controllable valves so that they may be opened/closed to a desired opening position so the corresponding water storage container will have or maintain a desired water level. In a preferred implementation, the plurality of controllable valves 106-116, are also provided with the capability to be manually controlled. In one implementation, an operator or user of the system may de-clutch the controllable valve and the valve ceases to be remotely controlled but will be controlled according to the manual controls provided at each of the plurality of controllable valves. This allows an operator at the valve to override the controls from the controller 280 if desired. Although not expressly shown in FIG. 1, electronic circuitry required to assist with the telemetry and control circuitry associated with each of the plurality of controllable valves will be provided. A generator 154 is shown in FIG. 1 and may be used to power the piggable flow meter 152 and its associated control circuitry and electronics, as well as the plurality of controllable valves 106-116, if needed, as well as any other electronics or electric motors implemented as part of the automated system 100. In other embodiments, a battery and/or a solar panel may be provided to assist with or provide backup power to the various systems, and circuitry that require electrical power. For example, a battery backup with a solar panel may be provided along with or adjacent to the mobile control trailer 190 to supply electrical demand to the various devices shown associated with the mobile control trailer 190.

The controller 280 is shown located within the remote control trailer 190. The display or screen 282, such a touchscreen display, may serve as the output display or screen of the controller 280, is also shown provided at the mobile command trailer. The mobile command trailer 190 is shown with various wireless transceivers, which in other implementations may be implemented as wired controls, so that the controller 280 may be programmed and implemented to communicate with and control the opening of the plurality of controllable valves 106-116, as well as receive the level indications or volume indications from the level indicators 122-132, which are each associated with the corresponding frac water storage containers 140-150. Wired connections are also shown from the mobile command trailer, and are discussed more fully below. The automated system 100 may use wireless, wired, or a combination of each.

The controller 280 may be implemented using any known or available processor, computer, or server technology that is suitable to implement a desired control scheme or control loop. The controller 280, in one implementation, is a programmable logic controller which may be referred to as a PLC. The controller 280 may be implemented, in one embodiment, using a touchscreen programmable logic controller or PLC, such as the VISION1210/1040 COLOR OPLC, which is manufactured by Unitronics Ltd. The controller 280 may be configured to perform a closed-loop control, such as a proportional control, a linear control, a non-linear control, or other desired control theory to control the opening/closing of the plurality of controllable valves 106-116 to maintain a desired level in each of the corresponding frac water storage containers 140-150. In one embodiment, the controller 280 uses a proportional integral-derivative ("PID") control loop feedback or controller to control the opening and closing of the plurality of controllable valves 106-116 to maintain a desired level in each of the corresponding frac water storage containers 140-150. The setpoint or water level that the controller 280 "controls" to may be one water level for all of the plurality of controllable valves 106-116 (which may be referred to as "gang mode" or "auto mode"), may be designated specifically/individually for each of plurality of controllable valves 106-116 (which may be referred to as an individual control mode), or a combination of each of these control modes, or other control modes. In another implementation, an operator may direct the controller 280 of the automated system 100 to remotely set one or more of the plurality of controllable valves to a desired valve opening, with an operator remotely adjust such setting as desired during the frac process.

In other implementations, the controller 280 may be implemented using a plurality of controllers or PLCs. For example, a plurality of controllers, as well as a plurality of displays or screens 282, may be used, and the plurality of controllers may operate and communicate in the automated system 100 using a CAN bus network to allow for the functionality of controller 280 to be implemented in a distributed controller architecture.

The storage device 270, as discussed, is also shown associated with the controller 280. The storage device 270 may be located at the mobile control trailer 190 or located remotely, such as cloud or network based storage device that is accessible through a data network or other communications link. The storage device 270 may be implemented as one of a plurality of storage devices that may include a hard disc drive, a solid state memory device, such as a memory card, a CD, a DVD, or other magnetic, optical, or electronic based storage device.

The controller 280 using the storage device 270, in a preferred embodiment, will periodically, such as at a programmable periodic interval, capture various readings of the automated system 100 and store such historical operational data. This may include, for example, the operational data of the first pump 176 and/or the second pump 178, along with the various pressures that may be measured in the automated system 100, such as the manifold pressure provided by the pressure transducer or transmitter 168, the pump discharge pressures measured by the pressure transmitters 192 and 196, and the air/pneumatic pressure measured by a pressure transmitter 160, as well as the various flows including at the discharge of the pump 176 and the flow into the input opening 104 of the manifold 102, such as that measured by the flow meter 172 and the piggable flow meter 152, respectively. Similarly, the setpoints to control the valve openings of the plurality of controllable valves 106-116, as well as the actual recorded valve openings, may be recorded at the storage device 270. This database or recording of the various information of the automated system 100 may be referred to as a historical log and may be used to confirm or provide an audit trail regarding the water provided into the automated system 100 and the water provided out of the automated system 100 through the outputs of the plurality of controllable valves 106-116. Additional information that will be preferably logged will include the information provided by the level indicators 122-132, and possibly video or still images provided through one or more of the plurality of cameras 274 that may be positioned as desired. In one embodiment, the output video or image data of the plurality of cameras 274 is stored on a separate video storage device, not shown in FIG. 1, and the images may be viewed remotely by the operator via a video or camera display 272, which may be positioned at the mobile control trailer 190, or remotely through a data network connection, such as the Internet or other video communication channel.

A junction box 170 is shown, in one embodiment of the automated system 100, coupling the various electrical connections from the controller 280 at the mobile control trailer 190 to the various controllable valves, cameras, etc. In one embodiment, the junction box 170 which may be an electrical quick-connect junction box so that coupling the controller 280 to the various components as shown in FIG. 1, may be done quickly and conveniently so that the system is easily transportable and may be quickly setup. As discussed more fully below in connection with FIG. 3, a large portion of the automated system 100 may be provided on a skid or trailer, such that the system, including at least the manifold 102 and plurality of controllable valves 106-116, may be easily moved from one job to another, and easily and reliably connected up to the controller 280 via the junction box 170.

The controller 280, as mentioned previously, may communicate with the various controllable devices and/or information devices or transducers of the automated system 100 through a wireless or wired communications link. In certain implementations, backup communication channels may be provided. The controller 280, in one embodiment, is provided at the mobile control (or command) trailer 190 where one operator may be used to operate and control the automated system 100. This provides significant savings and operational advantages over existing systems, which typically require more significant manpower. The display 282 is used to efficiently monitor the various pressures, flow rates, and water levels, as well as the valve openings of the plurality of controllable valves 106-116. The first pump 176 and the second pump 178 may be remotely started using the controller 280, all while positioned remotely from the first pump 176 and the second pump 178. Further, the RPM or operating level of each of the first pump 176 and the second pump 178 may be controlled and changed as needed by the operator located at the mobile command trailer 190 using the controller 280, which will be in communication with the first engine panel 180 and the second engine panel 182 of their respective pumps.

A wired connection, such as the electrical quick connect junction box 170 just discussed, may be used for a wired connection to the various plurality of controllable valves 106-116, and in one implementation, the mobile command trailer 190 will be provided in close proximity to the manifold 102 and the associated plurality of controllable valves 106-116 as well as the plurality of level indicators 122-132, to provide wired connections. In other implementations, communications may be provided through a wireless connection.

As discussed, the controller 280 may be implemented using one or more control schemes or control algorithms. In one embodiment, a gang control mode is implemented such that one level or desired volume is provided to the controller 280, and the plurality of controllable valves are subsequently opened and closed to allow for a desired flow of water from the various outputs of the manifold 102 to the corresponding controllable valves so that a desired level is maintained in each of the corresponding frac water storage containers. For example, if the six frac water storage containers 140-150 each have a capacity of 500 barrels, an operator may desire to have each of the frac water storage containers maintain a water level of 400 barrels. During a frac job or frac process, water is being pulled from the various frac water storage containers using an output manifold or outputs not shown in FIG. 1 and water must be subsequently provided from the manifold 102 and through the corresponding plurality of controllable valves to each of the frac water storage containers to maintain the 400-barrel level. The output flow connections where water is removed from the frac water storage containers 140-150 for the frac process are not shown in FIG. 1, as just mentioned. While in gang mode, a single setpoint is provided so that each of the plurality of controllable valves are opened and closed as determined by the controller 280 so that their corresponding or associated frac water storage containers maintain the desired 400 barrels. In alternative embodiments, a grouping of these plurality of controllable valves and associated frac water storage containers may be defined and that grouping may be provided in a gang mode such that each of them will have control to a single setpoint, such as the 400 barrels (which may be thought of a as a water level) that is used as a setpoint in the prior example.

In another embodiment, the controller 280 may be implemented using an individual control mode, which also may be referred to as "solo" mode. The individual control mode allows an operator to set a desired and specific water level or water volume to be provided in each of the six frac water storage containers 140-150. For example, the operator may provide a setpoint of 300 barrels for the water storage container 140, which, in turn, directs the controllable valve 106 to be opened and closed to maintain a 300-barrel level within the water storage container 140. The feedback loop in this controller is completed by the level controller 122 providing periodic or near real-time readings of the water level in the water storage container 140. This information is then provided either wirelessly or through a wire connection to the controller 280. In turn, the controllable valve 106 is opened or closed an amount, if necessary, to maintain the desired volume within the water source container 140. In the individual control mode, a setpoint is provided for each of the plurality of controllable valves. The operator may provide a setpoint of 400 barrels for the water storage container 142, which will result in the controller 280 opening and closing the controllable valve 108, if needed, to attempt to maintain the desired water level in the water storage container 142. A stop or "kill" switch may be provided through the controller 280, such as by the use of a touchscreen 282, to quickly close any of the controllable valves if needed.

In another implementation, the controller 280 may be used to remotely control the plurality of controllable valves of the automated system 100. In this implementation, one or more of the plurality of controllable valves 106-116 may have their opening set as desired by an operator. The operator will then monitor the readings from the various level indicators and adjust the openings of the corresponding plurality of controllable valves to either increase or decrease the level or volume of water or fluid within each of the frac water storage containers 140-150. In this mode, the operator, in effect, serves as the controller and is provided with the capability to remotely control the operation of the automated system 100. In other embodiments, a combination of one or more of the modes just described may be implemented.

The controller 280 may also implement "kill switch" functionality, as mentioned above, for each of the plurality of controllable valves 106-116. In such an implementation, if a problem should arise requiring the stoppage of flow of water into any of the various frac water storage containers, the operator, through the controller 280, and preferably through a touchscreen display 282, may touch an appropriate area of the screen to remotely and quickly close any of the plurality of controllable valves to stop the flow of water into the corresponding water storage container.

The flexibility of the automated system 100 provides for increased reliability, flexibility, and safety during the hydraulic fracturing process. Further, and as will be described more fully in connection with FIG. 3, the manifold 102 and associated plurality of controllable valves, along with the air compressor 118, and air dryer 120, which may be used to reduce any moisture within the pneumatic tubes that are provided from the air compressor 118, as well as various other hardware, as will be described more fully below, may be implemented on a skid or trailer setup so that a large portion of the automated system 100 may be conveniently and quickly transported from one frac job to another.

Once the frac job is complete or if there is a delay in the frac job, the automated system 100 provides the capability to remove the vast majority of any moisture or fluid still present in the automated system 100. In one implementation, this is achieved through a "pigging" process in which a pig is transported from a pig launcher, through an automated valve, through the manifold 102, through piggable flow meter 152, and to a pig catcher 174. In one implementation, the pig catcher 174 is provided near the first water source so that any moisture or liquids that are being removed from the automated system 100 may be delivered or provided back to the water source from which it came.

The pigging system as shown in FIG. 1 includes a pig launcher 166, a pig valve 164, the piggable flow meter 152, and the pig catcher 174. A pressure transducer 168, which also may be referred to as a pressure sensor or pressure gauge, is shown adjacent the manifold 102. The pressure transducer 168 provides a manifold pressure which is provided to the controller 280, and which is recorded by the storage device 270 and displayed by the display 282. In operation, a pig is inserted into (or already resides within) the pig launcher 166. An operator at the mobile command trailer 190 opens the pig valve 164 as well as a pig air valve 162. The air compressor 118 provides an output air pressure, which may be measured by the pressure transducer 160, through the pig air valve 162. This air pressure pushes the pig from the pig launcher 166 through the pig valve 164, through an opening in the manifold 102, through the piggable flow meter 152, which is provided at the input 104 of the manifold 102, and then through a connection line or pipeline to the pig catcher 174. As mentioned previously, this may be provided adjacent the piggable flow meter 152 or may be provided thousands of feet away depending on the particular drill site and proximity to a water source for use in the frac process. The pig, which is being forced through the various components and systems of the automated system 100 using the air pressure provided by the air compressor 118, pushes fluids and any other debris, sediment, or other substances so that the automated system 100 has most if not all water or fluid removed. This can be especially critical in cold weather climates where freezing weather may freeze the water within the automated system 100 and cause damage and/or system failure. In other implementations, the removal of the sediment, water and other substances prevents or reduces the amount of oxidation that may occur when such items are allowed to reside within the automated system 100.

FIG. 2 is a block diagram, schematic representation of the automated system 100 for monitoring and controlling the transfer of water during a hydraulic fracturing process similar to FIG. 1 that includes the capability to blend water from two or more water sources, such as an impaired water source, according to another implementation. FIG. 2 includes the addition of a third pump 300 adjacent a second water source. Although not shown in FIG. 2, preferably another pump will be provided in parallel with the third pump 300, similar to the arrangement shown and described in connection with the first pump 176 and the second pump 178 as shown and described in connection with FIG. 1. In one embodiment, the second water source may be an impaired water source, such as flowback or production water, such as from a prior frac job.

The controller 280 may be configured to operate the third pump 300, as described above in connection with the first pump 176 and the second pump 178, using an engine panel 302 through a wireless connection. As such, an operator adjacent the controller 280 at the mobile control trailer 190 may turn the third pump 300 on/off, set the RPM, and monitor and control other operational parameters as desired. A pressure transducer 304 may be provided to measure the discharge pressure of the third pump 300, and a flow meter 306 may be used to measure and monitor the flow rate from the discharge of the third pump 300. A flow meter 308, which may be provided at a great distance from the flow meter 306, may be positioned adjacent an input opening of a second manifold 310.

The second manifold 310, just like the manifold 102, may have a plurality of output openings coupled to the plurality of frac water storage containers 140-150 through a plurality of controllable valves 312-322. The plurality of controllable valves 312-322 are shown in FIG. 2 coupled to the output openings of the second manifold 310, and the plurality of controllable valves 312-322 may be controlled using the controller 280 (or one or more controllers) as described in connection with the plurality of controllable valves 106-116 associated with the manifold 102. As such, the automated system 100 of FIG. 2 provides the significant capability to blend two water sources within the frac water storage containers 140-150. This may include, for example, impaired water, flowback water, and/or produced water retrieved from an geologic formation. Additional manifolds and controllable valves may be used for blending additional water/liquid sources.

The flow meter 306 and the flow meter 308 will, in a preferred implementation, be in communication with the controller 280 so that flow rates may be monitored, viewed, and stored, such as in a historical log of operational data at the storage device 270, especially when an impaired water source is used, which increases the need to track usage. The flow meter 308 may be provided, in one implementation, as a piggable flow meter 308, similar to the piggable flow meter 152. Similarly, and although not shown in connection with the second manifold 310, a pig launcher and related components may be implemented to allow the second manifold to be "pigged" as described in connection with the manifold 102 of FIG. 1.

In another implementation of the automated system 100, which may be referred to as a blended automated system, the water from the first water source and the second water source are both provided to the input opening 104 of the manifold 102, and metered through the piggable valve 152. This connection is not expressly shown in FIG. 2. This provides blending within the manifold 102 such that the blended solution may then be provided to the plurality of frac water storage containers 140-150 through the plurality of controllable valves 106-116, as controlled through the controller 280.

Figure 3:
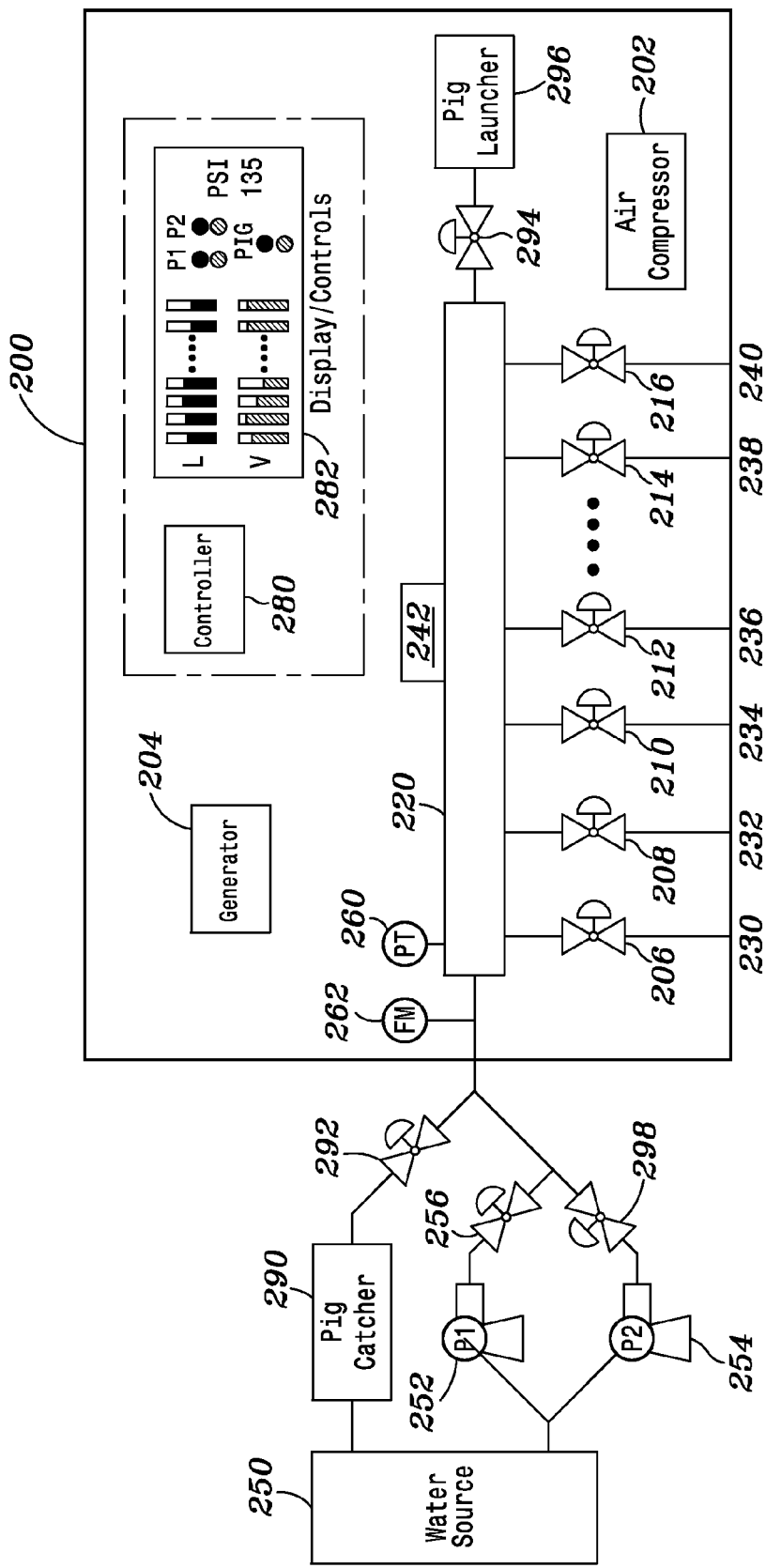
FIG. 3 is a block diagram, schematic representation of an assembly or mobile trailer, such as a skid mounted or trailer mounted assembly, for use in an automated system for monitoring and controlling the transfer of water during a hydraulic fracturing process according to an implementation.

FIG. 3 is a block diagram, schematic representation of an assembly 200, such as a skid mounted or trailer mounted assembly, for use in an automated system 100 for monitoring and controlling the transfer of water during a hydraulic fracturing process according to one implementation. The assembly 200 includes, in one implementation, a manifold 220, having a plurality of output openings and coupled to a plurality of controllable valves 206-216, which includes a plurality of outputs 230-240, which are operable to couple to a piping or tubing for providing water to a plurality of frac water storage containers, such as the plurality of frac water storage containers 140-150 of FIGS. 1 and 2. The assembly 200 further includes an air compressor 202, which may be used to operate the plurality of controllable valves 206-216, as well as provide air pressure to launch a pig from a pig launcher 296, through a pig valve 294, as previously described in connection with FIG. 1, and through the manifold 220, and thereafter to a destination point.

The manifold 220 may also include a port or opening 242 where a substance, such as an anti-freeze, anti-corrosive solution, or other desirable compound may be injected into the manifold 220 to treat the water flowing through the assembly 200. In other embodiments, the port or opening 242 may reside adjacent or distal to the manifold 220. A pressure transducer 260 is provided adjacent the manifold 220 to provide a pressure reading of the manifold 220. Further, a flow meter 262 may be provided adjacent an input opening or at an input opening of the manifold 220 to record the flow of water or fluids into the manifold 220. A generator 204 is also shown provided as part of the assembly 200. The generator 204 may be used to provide electrical power to any system of the assembly 200, such as the flow meter 262 and video cameras, not shown in FIG. 3.

The controller 280 and the display 282, which may be implemented as a touchscreen control system integrated with the controller 280, is shown in FIG. 3 with a dashed box surrounding it. The dashed box indicates that these elements may be provided separately from the assembly 200 or, in certain implementations, may be provided as part of the assembly 200. In operation, the elements of assembly 200 may be monitored and/or controlled, in a preferred implementation, using the controller 280 and the display 282. As described previously, the controller 280 and the display 282 may be provided at a mobile control trailer, which is not shown in FIG. 3, but may be considered to be a part of the assembly 200.

In operation, the assembly 200 may be mounted on a skid or trailer, which allows it to be conveniently moved from one hydraulic fracturing location to another, and to be easily setup and made operational. The controller 280 may communicate with the various elements of the assembly 200 through a wireless and/or wired communications link, or combinations thereof.

In operation during a water transfer process, water from a water source 250 is provided to the opening of the manifold 220 using either a first pump 252 or a second pump 254. Various valves, such as the valve 256 and the valve 298 may be provided at the discharge of the first pump 252 and the second pump 254. A valve 292 remains closed as water flows from the first water source 250 through either the first pump 252 or the second pump 254 to the input opening of the manifold 220. The plurality of controllable valves 206-216 are controlled using a controller 280, and their outputs are connected through outputs 230-240 to corresponding frac water storage containers, not shown in FIG. 3. The display 282 provides an example implementation of a display that shows the water levels at the various frac water storage containers, the valve opening positions of the various plurality of controllable valves 206-216, as well as the manifold pressure as provided by the pressure transducer 260 and the status of the pig and related valves.

During a pigging operation, the valves 256 and 298 may be closed and the valve 292 may be open. The air compressor 202, in addition to providing mechanical pressure to open and close the plurality of valves 206-216, may be used to provide air pressure to launch a pig provided within the pig launcher 296, which will move through the remotely controlled pig valve 294 and through the manifold 220, pushing liquids, fluids, and sediments that may be located therein. The pig is then directed through the valve 292 into the pig catcher 290. The water, fluids, and sediments may then be provided back to the water source 250, which is where they originated. The pig may be retrieved from the pig catcher 290 and reloaded at the pig launcher 296. In other implementations, the pig catcher 290 is not provided and the pig simply pushes it way to the water source 250 where it is then retrieved.

This unique arrangement of elements provides a convenient and reliable system to automatically monitor and control the transfer of water during a hydraulic fracturing process.

Figure 4:
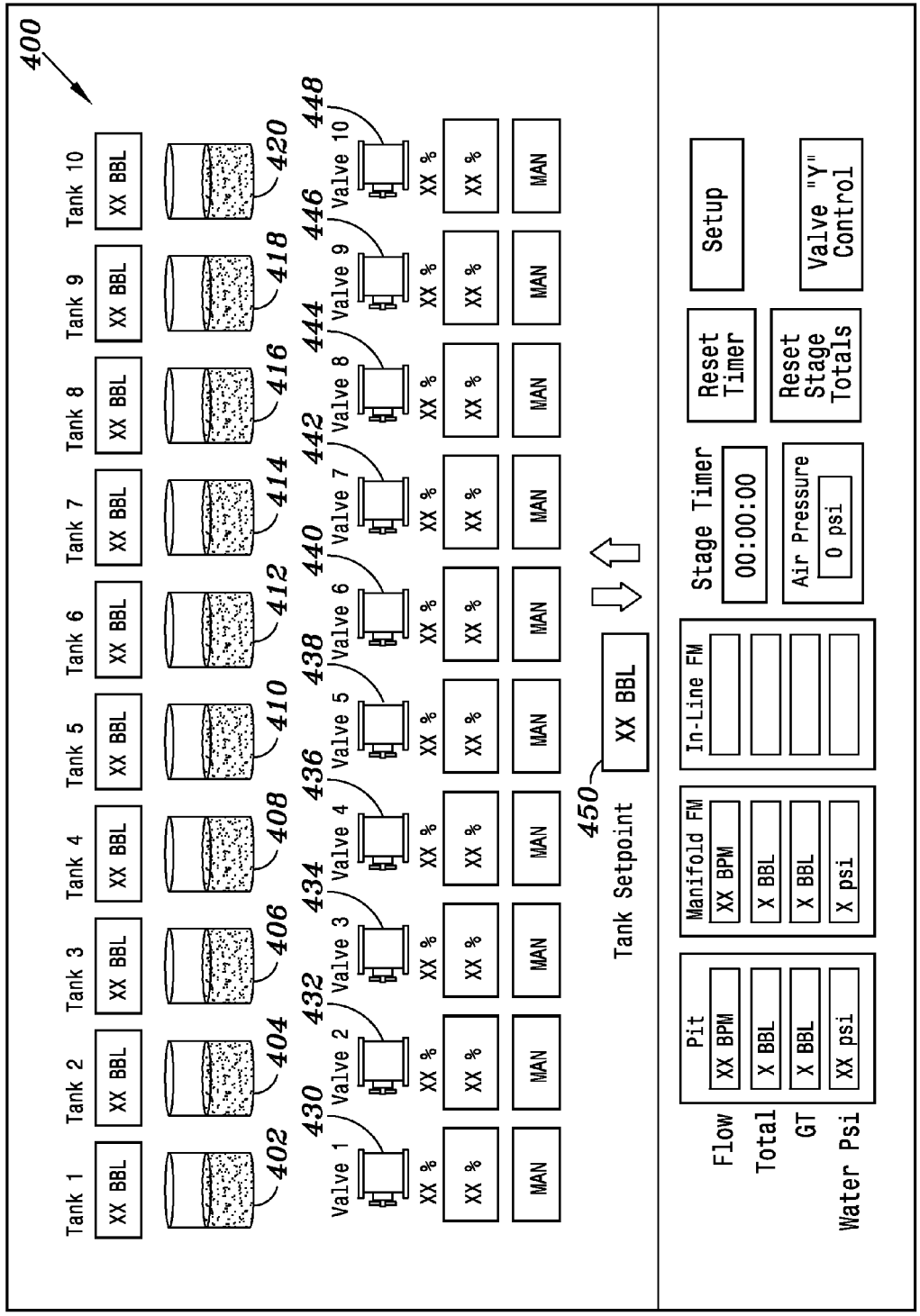
FIG. 4 is a representation of a touchscreen control screen of a display for use in an automated system for monitoring and controlling the transfer of water to a plurality of frac water storage containers during a hydraulic fracturing process showing water levels of the various frac water storage containers and the plurality of controllable valves with some in a manual control mode and others in an automatic control mode with a tank setpoint provided for the valves in the automatic control mode.

FIG. 4 is a representation of a touchscreen control screen 400 of a display for use in an automated system for monitoring and controlling the transfer of water to a plurality of frac water storage containers during a hydraulic fracturing process showing water levels of the ten frac water storage containers 402, 404, 406, 408, 410, 412, 414, 416, 418, and 420 and the corresponding ten controllable valves 430, 432, 434, 436, 438, 440, 442, 444, 446, and 448 with some in a manual control mode and others in an automatic control mode, as indicated below each such valve, with a tank setpoint provided at 450 for the valves in the automatic control mode.

The arrows next to the tank setpoint may be selected, in one embodiment, to increase or decrease the tank setpoint. Underneath each of the controllable valves 430-448, is a wired or wireless data showing the percentage opening of the corresponding valve. In the box below such percentage, is the setpoint for the valves in manual mode, and the desired percentage opening of the valves in automatic mode as determined by the control algorithm, such as PID control algorithm and the various tolerances and date provided as desired during setup.

Above each of the frac water storage containers 402-420, is a wired or wireless data graphically illustrating the level or barrels in each such frac water storage container. This touchscreen control screen 400 may be used for a first manifold, and a similar or the same type of screen may be used for a second or third manifold. This allows each manifold and the corresponding valves to be controlled as desired and as provided by this touchscreen control screen 400. At the bottom of the touchscreen control screen 400 is various data including a stage timer which may correspond to the time duration of a particular hydraulic fracturing stage that is currently being performed, the air pressure that may be provided, in certain embodiments, from an air compressor that may be used to drive the various controllable valves 430-448. The timer may be reset by selecting the corresponding button, and/or the stage totals may be reset. A setup button is shown which allows any of a variety of parameters to be set. For example, the current embodiment may provide any of a number of alarms, which may be triggered based upon the setup data that is provided. For example, a pressure, pH reading, temperature reading, flow rate, frac water storage container level, or any other value of interest or that becomes out of a particular or desired range, as defined through the setup data, an alarm may sound or provide a visual alert. Similarly the controllable valves 430-448 may be color coded to designate a particular status. In one embodiment, green color indicates that the valves are in some type of control mode, such as manual or automatic control mode, while red may indicate that the valves are simply set at a particular opening and are not being remotely controlled. In other embodiments, even when valves are provided in a manual mode, such as controllable valve 436, if it appears that a frac water storage container is close to overflowing or is overflowing, the system may automatically shut or close all ten controllable valves 430-448, even those that are in manual control mode. This automatic safety feature may prevent considerable damage or safety hazards that may otherwise occur.

The bottom portion of FIG. 4 also provides flow rates from the pit or water source in which the frac water is being provided to the first manifold. The total flow provided from such water source, for a particular frac stage, the grand total, as well as the water pressure that the suction and/or discharge of the pump located at or adjacent the first water source.

Similarly, various data points may be provided for the manifold. Such data points may include flow rate, and any of a variety of other data points which may be provided, depending on a particular embodiment, via wireless transceivers or through a wired communications link.

Figure 5:
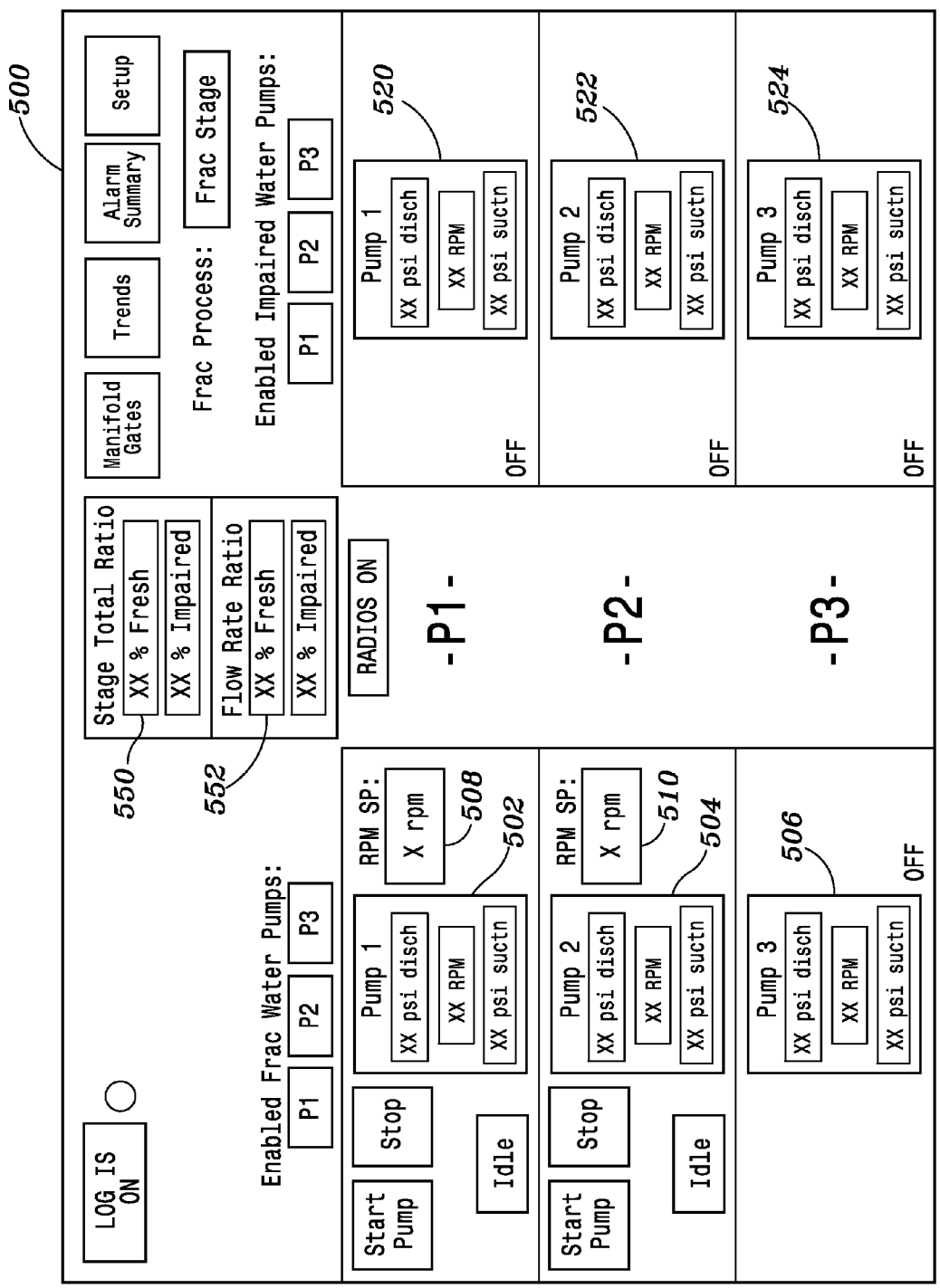
FIG. 5 is a representation of another touchscreen control screen of a display for use in an automated system for monitoring and controlling pumps of a first water source and a second water source during the transfer of water to a plurality of frac water storage containers during a hydraulic fracturing process, and providing the capability to automatically control the blending of two water source, including one that may include impaired, flowback, and/or produced water.

FIG. 5 is a representation of another touchscreen control screen 500 of a display for use in an automated system for monitoring and controlling pumps of a first water source and a second water source during the transfer of water to a plurality of frac water storage containers during a hydraulic fracturing process, and providing the capability to automatically control the blending of two water source, including one that may include impaired, flowback, and/or produced water.

The left side of the touchscreen control screen 500 is a first pump 502, a second pump 504, and a third pump 506, which is in an "off" state or may not be implemented in certain embodiments. In one embodiment, the first pump 502 and the second pump 504 are located at or adjacent a first water source, such as a fresh frac water source, and are used together, either in parallel or with one in hot standby mode, to provide water to a first manifold. The various rpm levels of the first pump 502 and the second pump 504 are shown in FIG. 5, as well as the discharge pressure and suction pressure. Similarly, a series of touchscreen buttons to start, stop, and idle each such pump are provided to the left of each of the first pump 502 and the second pump 504. An rpm level setpoint 508 is provided for the first pump 502, while an rpm level setpoint 510 is provided for the second pump 504.

In operation, the one or more controllers of the automated system may be used to run a control algorithm in which the setpoint 508 and the setpoint 510 are maintained as desired. If additional flow rate is needed from the frac water source provided at the first water source, the setpoints of the first pump 502 and the second pump 504 may be adjusted as needed.

Similarly, three pumps are shown associated with a second water source, in this case, an impaired water source, for use in providing impaired water to either a first manifold or to a second manifold, as described herein. A first pump 520, a second pump 522, and a third pump 524, are shown and each are associated with the second water source, which, in this case, is an impaired water source. If any such pumps 520-524 were enabled or idled, an rpm level setpoint button would likely be provided, in this embodiment, to allow such pumps to be controlled using a desired rpm level setpoint as just described in connection with the first pump 502 and the second pump 504. This may be set at a level that provided either more or less of the impaired water as compared to the frac water from the first water source as provided from the first pump 502 and the second pump 504. This provides a desired ratio, as shown at 550 and 552 of the touchscreen control screen 500. These ratios, which may be provided for each frac stage and for the total frac job, show a ratio between fresh water, which is provided from the fresh water source, and impaired water, which is provided at the second water source. In this embodiment, the radios are shown to be "on" such that the various control information and data is telemetered via radio frequency to the one or more controllers of the automated system.

Referring to the upper left, the various data may be logged and stored on any of a variety of known or available data storage devices. Similarly, an alarm summary and a setup page may be provided to change or establish any desired or needed setup parameters. In certain embodiments, various trends may be graphed to provide an operator with information as to how a pump may be performing so that appropriate action may be taken if needed.

Figure 6:
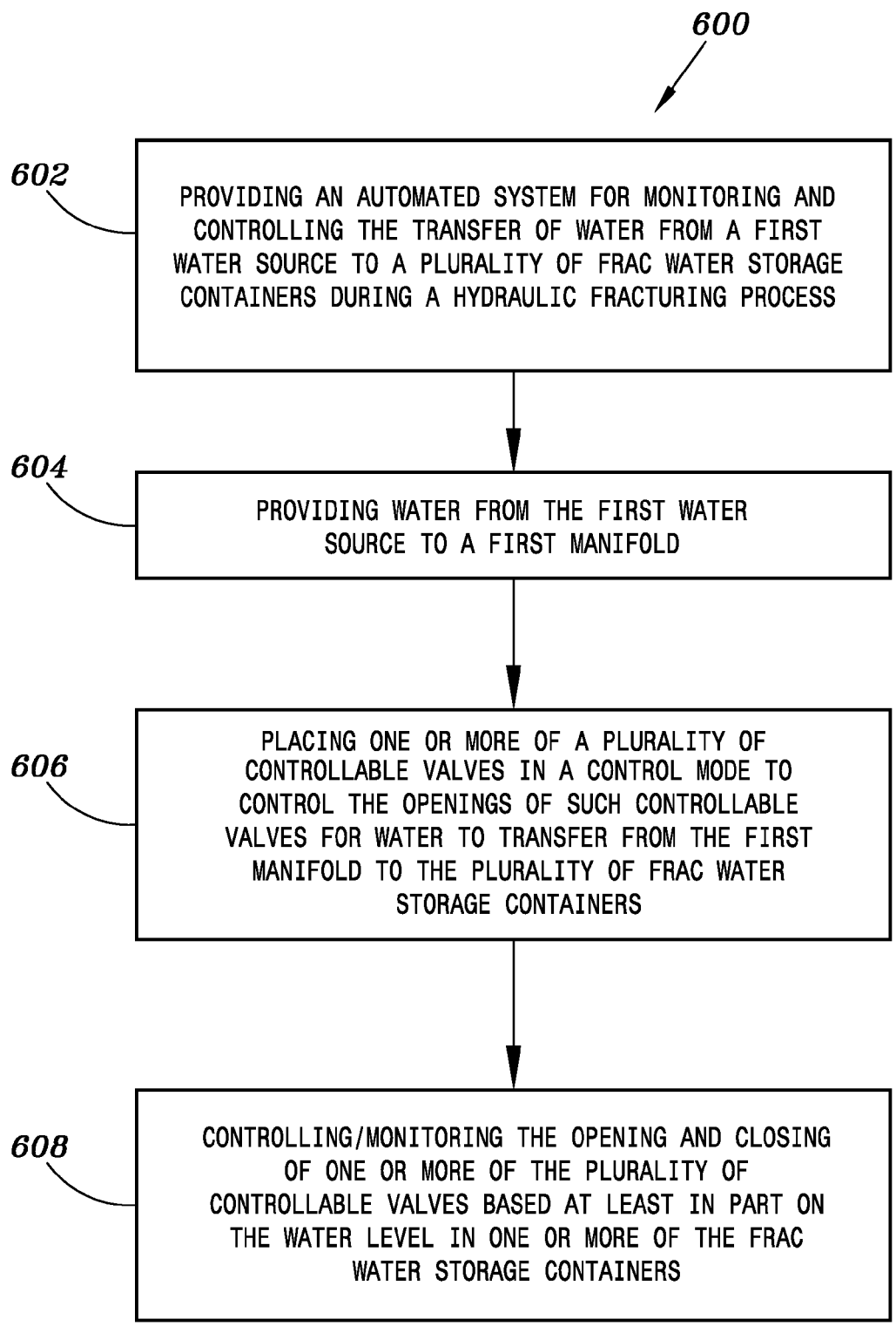
FIG. 6 is a flowchart of a method of operating an automated system for monitoring and controlling the transfer of water to a plurality of frac water storage containers from a first water source and using one manifold.

FIG. 6 is a flowchart of a method 600 of operating an automated system for monitoring and controlling the transfer of water to a plurality of frac water storage containers from a first water source and using a first manifold. The method 600 begins at 602 where an automated system for monitoring and controlling the transfer of water is provided. This automated system is configured to provide water from a first water source, such as a fresh water frac water source, to a plurality of frac water storage containers during a hydraulic fracturing process. The automated system for monitoring and controlling the transfer of water may be provided using any one or more of the embodiments previously discussed herein.

Proceeding next to 604, water is provided from the first water source to a first manifold. The manifold includes a plurality of openings, and each such opening is configured or in fluid communication with a controllable valve that may be remotely controlled. The controllable valves may be controlled through a controller, or one or more controllers. As such, at 606, the controllable valves may be placed in any one of a variety of modes to control the opening and closing of such valves. For example, all of the valves may be placed in an automatic control mode, such that each of the valves are opened and closed based on the feedback from the amount or volume of water provided in an associated frac water storage container associated with each of the plurality of controllable valves. As the level in such tanks falls below a control setpoint, the corresponding controllable valve may be opened to allow more water or fluid to proceed into the frac water storage container. Conversely, if the water level or volume in such frac water storage container is above the desired control setpoint, the corresponding valves may be closed or the opening reduced from a first setting to a more closed position so that less water or fluid will flow to such frac water storage container. During the frac process, it should be understood that water may be pulled or retrieved from the frac water storage container at high rates, so it is imperative that the control valves are accurately set and provided at a level to maintain a level as desirable as possible for the required frac water storage container level.

Proceeding next to 608, and as just discussed, the various controllable valves are opened and closed, based on their particular control mode, to maintain the water or fluid level in one or more of the frac water storage containers that correspond to such controllable valve. In another embodiment, ten controllable valves may be provided and each of which corresponds to a separate frac water storage container. Six of these valves may be provided in an automatic mode while the remaining four controllable valves may be provided in a manual mode that allows for the corresponding frac water storage container to maintain adequate levels. Depending on the plumbing/configuration of the frac water storage tanks, during some hydraulic fracturing processes, certain frac water storage containers provide more of the water during the frac process. As such, the associated controllable valves between the first manifold and such frac water storage container may be provided at a more open position to allow for more water or fluids to flow in to such heavily used frac water storage containers.

It should also be understood that the flow rate into the first manifold, although not shown in FIG. 6, may be increased by using the one or more of the controllers of the automated system to communicate with the one or more pumps to increase the discharge rate of such one or more pumps configured to supply water from the first water source. In one embodiment, this may be achieved through increasing the rpm rate of the corresponding pump engine, such as a diesel engine, to create more discharge pressure. Some of the pumps may operate in parallel and serve as hot-standby in the event one of the pumps malfunctions or ceases to operate during the frac job. This increased flow rate will allow more frac water to be provided to the corresponding frac water storage containers during the hydraulic fracturing process.

Figure 7:
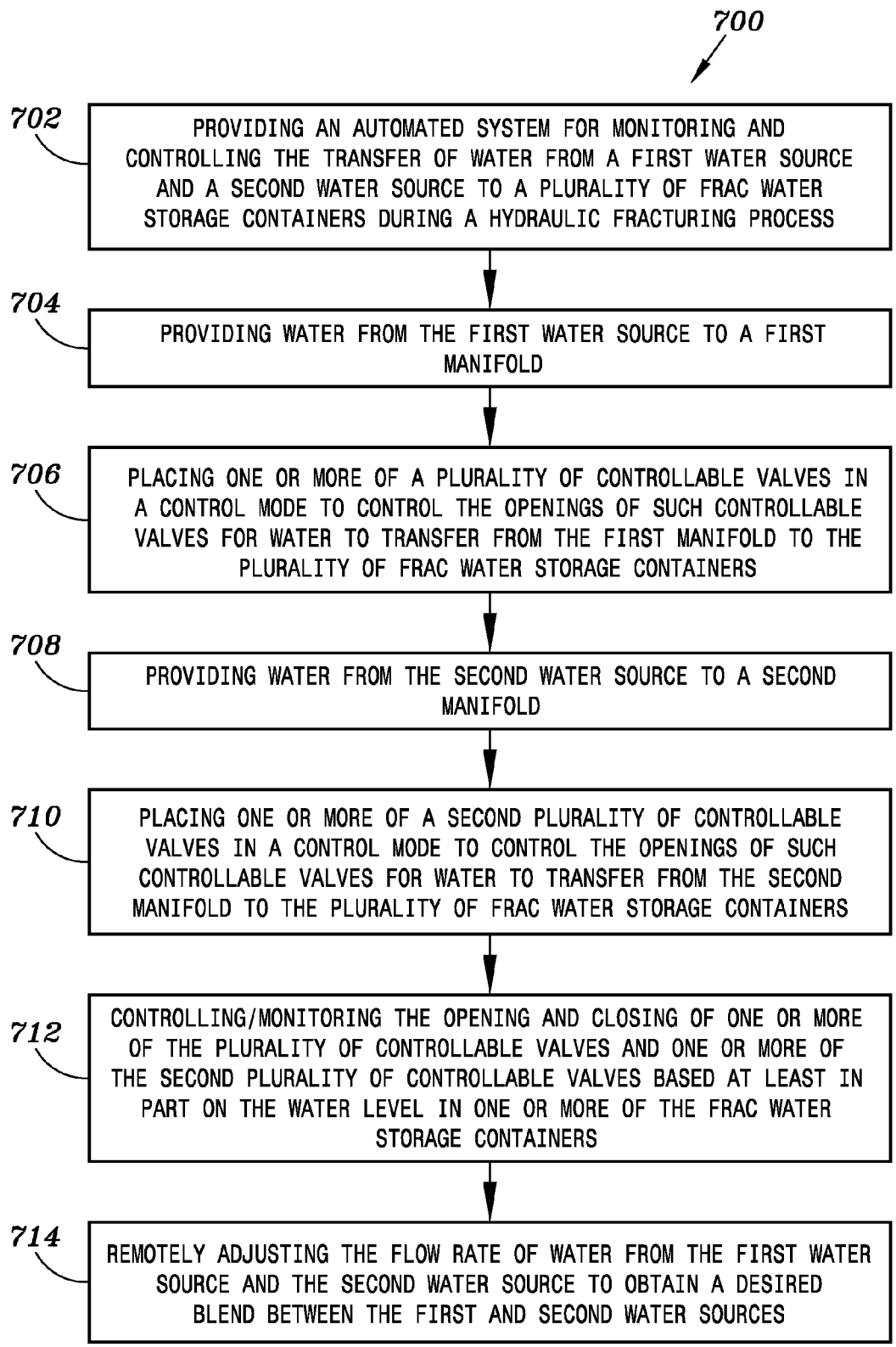
FIG. 7 is a flowchart of a method of operating an automated system for monitoring and controlling the transfer of water to a plurality of frac water storage containers from a first water source and a second water source using a first manifold and a second manifold in what may be referred to as a method of blending two water sources.

FIG. 7 is a flowchart of a method 700 for operating an automated system for monitoring and controlling the transfer of water to a plurality of frac water storage containers from a first water source and a second water source using a first manifold and a second manifold in what may be referred to as a method of blending two water sources. Before proceeding, it should be understood that in certain other embodiments, two or more water sources, including a pair of water sources, may be blended using one manifold. In such a configuration, the automated system will include a manifold with more than one input opening to allow multiple water sources to be injected into the first manifold and hence provided to corresponding frac water storage containers. Similarly, it should be understood that additional manifolds may be implemented to blend a plurality of water sources, including impaired water, flowback water, and, for example, produced water.

Proceeding back to FIG. 7, the automated system and method 700 includes the first water source and a second water source that may be blended or used together to provide frac water to a plurality of frac water storage containers for use during the hydraulic fracturing process. At 702, the automated system is provided in an embodiment as described herein to blend a first water source with a second water source using a corresponding first manifold and second manifold. Proceeding next to 704, water from the first water source is provided to the first manifold, and at 706, one or more of a plurality of controllable valves, each configured at or in fluid communication with an opening of the first manifold, are placed in a control mode. This may include an automatic mode, a manual mode, a gang control mode with a single setpoint for one or more of the plurality of controllable valves, an individual control mode in which each controllable valve has its own setpoint, or any other available control mode.

Proceeding to 708, water, such as impaired water, is provided from the second water source to the second manifold. Just as in 706, the plurality of controllable valves in 710 are associated with openings of the second manifold and each such controllable valve is placed in a desired control mode. The settings of the various control modes may depend upon the desired blend between the first water source and the second water source.

At 712, the various controllable valves are opened and closed based on their particular control mode so that a desired level of blended water sources is provided in each of the associated frac water storage containers. In such a setup, each frac water storage container may have two inputs of fluid or water, one from each of the frac water sources, which correspond to the first manifold and a second manifold. At 714, the flow rates into each of the first manifold and the second manifold may be controlled through the one or more pumps configured to provide water from the first water source and the second water source. In one embodiment, assuming the pump is a combustion engine, such as a diesel engine, the rpm level of the pump engine may be increased to increase the associated flow rate to achieve a desired blend. This is detailed in 714.

The capability to set the flow rates, by communicating with the one or pumps associated with each of the two water sources (or a plurality of water sources in other blending configurations), allows for the correct or desired amount of blending to occur. For example, during the hydraulic fracturing process, the well bore pressure may become elevated to an undesirable level for any of a variety of reasons. Assuming one of the frac water sources being blended is a flowback or impaired water, the higher viscosity or such water or fluid tends to increase the pressure needed during the hydraulic fracturing process, the present embodiment provides the capability, in real-time (or near real-time), to modify the blend so that more fresh water is being used so the undesirable well bore pressure may be alleviated or assisted. This may be achieved, in one embodiment, by adjusting the flow rates of the two or more sources being blended by changing the rpm levels of the one or more pumps associated with each such source. Conversely, if the well bore pressure is too low or at an acceptable level, it may be advantageous to change to blend to include more impaired, flowback, and/or produced water.

In the foregoing description of certain embodiments, specific terminology has been resorted to for the sake of clarity. The disclosure, however, is not intended to be limited to the specific terms so selected, and it is to be understood that each specific term includes other technical equivalents that operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An automated system for monitoring and controlling the transfer of water from a first water source to a plurality of frac water storage containers during a hydraulic fracturing process, the automated system comprising:
    a first manifold operable to receive water from the first water source through at least one input, and to supply water to a plurality of output openings for use in the hydraulic fracturing process;
    a plurality of controllable valves, wherein each of the plurality of controllable valves is configured to be in fluid communication between an input to one of the plurality of frac water storage containers and with one of the plurality of output openings of the first manifold;
    a plurality of level indicators, wherein each of the plurality of level indicators is configured to one of the plurality of frac water storage containers to determine a water level at each such one of the plurality of frac water storage containers;
    a first flow meter configured to measure a flow of water into the first manifold;
    a first pump configured to be remotely operated, to receive water from the first water source, and to pump water through a discharge to the at least one input of the first manifold with the plurality of output openings;
    one or more controllers configured to at least partially control the operation of the first pump to allow water to be pumped into the first manifold, and wherein the one or more controllers are in communication with the plurality of controllable valves and configured to control the opening and closing of each of the plurality of controllable valves to a desired opening position so that water from the first water source in the first manifold may be provided to each of the plurality of frac water storage containers through the plurality of output openings of the first manifold based at least partially on the water level of the plurality of frac water storage containers determined by the associated plurality of level indicators;
    one or more displays operable to receive and display information that includes the water level of one or more of the plurality of frac water storage containers as determined at least partially by one or more of the plurality of level indicators, the valve opening positions of one or more of the plurality of controllable valves, the flow of water into the first manifold, and operating information of the first pump; and
    a storage device configured to receive and store information that includes two or more of the following selected from the group consisting of:
        the water level of one or more of the plurality of frac water storage containers as determined at least partially by one or more of the plurality of level indicators,
        a water volume level of one or more of the plurality of frac water storage containers as determined at least partially by one or more of the plurality of level indicators,
        the valve opening positions of one or more of the plurality of controllable valves,
        operating information of the first pump, and
        the flow of water into the manifold from the first flow meter.

2. The automated system for monitoring and controlling the transfer of water during a hydraulic fracturing process according to claim 1, further comprising:
    a plurality of water level displays each configured to receive and display the water level of one of the plurality of frac water storage containers as determined by a corresponding one of the plurality of level indicators that are each configured relative to one of the plurality of frac water storage containers to determine a water level at such one of the plurality of frac water storage containers.

3. The automated system for monitoring and controlling the transfer of water during a hydraulic fracturing process according to claim 1, wherein each of the plurality of level indicators is configured relative to one of the plurality of frac water storage containers to determine the water volume level present at such one of the plurality of frac water storage containers that is based at least in part on the corresponding water level at each such one of the plurality of frac water storage containers.

4. The automated system for monitoring and controlling the transfer of water during a hydraulic fracturing process according to claim 1, wherein the one or more controllers are further configured to generate the corresponding water volume level at each one of the plurality of frac water storage containers based at least in part on the water level as provided by each one of the plurality of level indicators.

5. The automated system for monitoring and controlling the transfer of water during a hydraulic fracturing process according to claim 1, wherein the plurality of frac water storage containers include a plurality of frac water tanker trailers.

6. The automated system for monitoring and controlling the transfer of water during a hydraulic fracturing process according to claim 1, wherein the first flow meter is a piggable flow meter configured to allow a pig to pass through the first flow meter.

7. The automated system for monitoring and controlling the transfer of water during a hydraulic fracturing process according to claim 1, further comprising:
    a plurality of cameras operable to generate video that can be viewed remotely, the cameras positioned to view one or more selected from the group consisting of:
        one or more of the plurality of controllable valves,
        one or more of the plurality of level indicators, and
        one or more of the frac water storage containers, the first flow meter, and the first pump.

8. The automated system for monitoring and controlling the transfer of water during a hydraulic fracturing process according to claim 7, wherein the storage device is further configured to receive and store at least a portion of the video generated by one or more of the plurality of cameras.

9. The automated system for monitoring and controlling the transfer of water during a hydraulic fracturing process according to claim 1, further comprising:
    a pig launcher configured to receive a pig and to provide the pig at a launch location selected from the group consisting of:
        an opening of the first manifold,
        adjacent the at least one input of the first manifold, and
        adjacent the first flow meter; and
    a pig catcher configured to receive the pig after it travels from the pig launcher.

10. The automated system for monitoring and controlling the transfer of water during a hydraulic fracturing process according to claim 9, further comprising:
    a remotely controlled valve positioned between the pig launcher and the launch location, and wherein the one or more controllers are further configured to control the opening and closing of the remotely controlled valve positioned between the pig launcher and the launch location.

11. The automated system for monitoring and controlling the transfer of water during a hydraulic fracturing process according to claim 9, wherein the pig catcher is configured to receive the pig after it travels from the pig launcher, through at least the first flow meter, and through at least a portion of a pipe configured to receive water from the discharge of the first pump.

12. The automated system for monitoring and controlling the transfer of water during a hydraulic fracturing process according to claim 9, wherein the pig catcher is configured to receive the pig after it travels from the pig launcher, through at least a portion of the first manifold, and through at least a portion of a pipe configured to receive water from the discharge of the first pump.

13. The automated system for monitoring and controlling the transfer of water during a hydraulic fracturing process according to claim 9, further comprising:
    a remotely controlled valve positioned between the pig catcher and the first manifold, and wherein the one or more controllers is further operable to control the opening and closing of the remotely controlled valve positioned between the pig catcher and the first manifold.

14. The automated system for monitoring and controlling the transfer of water during a hydraulic fracturing process according to claim 13, further comprising:
    the pig positioned in the pig launcher; and
    an air compressor operable to generate air pressure to traverse the pig from the pig launcher to the pig catcher.

15. The automated system for monitoring and controlling the transfer of water during a hydraulic fracturing process according to claim 1, further comprising:
    a second pump configured to be remotely operated, to receive water from the first water source, and to pump water through a discharge of the second pump to the at least one input of the first manifold, and wherein the one or more controllers is further operable to control an operation of the second pump to allow water to be pumped to the at least one input of the first manifold.

16. The automated system for monitoring and controlling the transfer of water during a hydraulic fracturing process according to claim 15, further comprising:
    a second flow meter positioned adjacent the discharge of the first pump and the discharge of the second pump, and operable to measure the flow of water to the first manifold.

17. The automated system for monitoring and controlling the transfer of water during a hydraulic fracturing process according to claim 1, further comprising:
    a second pump configured to be remotely operated, to receive water from a second water source, and to pump water through a discharge of the second pump to the at least one input of the first manifold, and wherein the one or more controllers further is operable to control an operation of the second pump to allow water from the second water source to be pumped to the at least one input of the first manifold.

18. The automated system for monitoring and controlling the transfer of water during a hydraulic fracturing process according to claim 17, wherein the first water source includes water, and the second water source includes one or more selected from the group consisting of impaired water, frac flowback water, and production water.

19. The automated system for monitoring and controlling the transfer of water during a hydraulic fracturing process according to claim 1, wherein the storage device is configured to periodically store some or a portion of the received information, and such information forms an historical log of the transfer of water during the hydraulic fracturing process.

20. The automated system for monitoring and controlling the transfer of water during a hydraulic fracturing process according to claim 1, further comprising:
    a second flow meter configured to measure the flow of water from the discharge of the first pump.

21. The automated system for monitoring and controlling the transfer of water during a hydraulic fracturing process according to claim 20, further comprising:
    a second manifold operable to receive water from a second water source through at least one input, and to supply water from the second water source to a plurality of output openings of the second manifold;

a second plurality of controllable valves, wherein each of the second plurality of controllable valves is configured to be in fluid communication between an input to one of the plurality of frac water storage containers and with one of the plurality of output openings of the second manifold;

a third flow meter configured to measure a flow of water into the second manifold;

a second pump configured to be remotely operated, to receive water from the second water source, and to pump water through a discharge to the input of the second manifold with the plurality of output openings of the second manifold;

a fourth flow meter configured to measure the flow of water from the discharge of the second pump; and wherein the one or more controllers are further configured to at least partially control the operation of the second pump to allow water from the second water source to be pumped into the second manifold, and wherein the one or more controllers are in communication with the second plurality of controllable valves and configured to control the opening and closing of each of the second plurality of controllable valves to a desired opening position so that water from the second water source in the second manifold may be provided to each of the plurality of frac water storage containers through the plurality of output openings of the second manifold based at least partially on the water level of the plurality of frac water storage containers determined by the associated plurality of level indicators.

22. The automated system for monitoring and controlling the transfer of water during a hydraulic fracturing process according to claim 21, wherein the water from the second water source is selected from the group consisting of impaired water, flowback water from a previous hydraulic fracturing process, and production water from an underground geologic formation.

23. The automated system for monitoring and controlling the transfer of water during a hydraulic fracturing process according to claim 21, wherein the one or more controllers are in communication with the second flow meter to receive the flow of water from the discharge of the first pump, and the fourth flow meter to receive the flow of water from the discharge of the second pump, and wherein the storage device is further configured to receive and store information that includes the flow of water from the discharge of the first pump and the flow of water from the discharge of the second pump.

24. The automated system for monitoring and controlling the transfer of water during a hydraulic fracturing process according to claim 20, further comprising:

a second pump configured to be remotely turned on and off, to receive water from a second water source, and to pump water through a discharge to the first water source; and a third flow meter operable to measure the flow of water from the discharge of the second pump, and wherein the storage device is further configured to receive and store information that includes the flow of water from the discharge of the second pump that corresponds to the water provided from the second water source to the first water source.

25. The automated system for monitoring and controlling the transfer of water during a hydraulic fracturing process according to claim 1, further comprising:

an injection port adjacent an opening in the first manifold and wherein a substance may be injected into the system during the transfer of water during the hydraulic fracturing process, and wherein the substance injected in the injection port includes one or more selected from the group consisting of chlorine dioxide, an anti-corrosive agent, an anti-freeze, an alcohol, a fluid with a freezing point lower than the freezing point of water, a pH controlling agent, and a decontamination agent.

26. The automated system for monitoring and controlling the transfer of water during a hydraulic fracturing process according to claim 1, further comprising:

an injection port positioned between the discharge of the first pump and the at least one input of the first manifold, and wherein a substance may be injected into the system during the transfer of water during the hydraulic fracturing process, and wherein the substance injected in the injection port includes one or more selected from the group consisting of chlorine dioxide, an anti-corrosive agent, an anti-freeze, an alcohol, a fluid with a freezing point lower than the freezing point of water, a pH controlling agent, and a decontamination agent.

27. The automated system for monitoring and controlling the transfer of water during a hydraulic fracturing process according to claim 1, further comprising:

a water treatment system positioned between the discharge of the first pump and the at least one input of the first manifold, and the water treatment system configured to treat the water before the water is provided to the at least one input of the first manifold and during the transfer of water during the hydraulic fracturing process.

28. The automated system for monitoring and controlling the transfer of water during a hydraulic fracturing process according to claim 27, wherein the water treatment system includes the use of a substance selected from the group consisting of chlorine dioxide, an anti-corrosive agent, a pH controlling agent, and a decontamination agent.

29. The automated system for monitoring and controlling the transfer of water during a hydraulic fracturing process according to claim 1, further comprising:

an air compressor operable to actuate the opening and closing of the plurality of controllable valves to control the plurality of controllable valves.

30. The automated system for monitoring and controlling the transfer of water during a hydraulic fracturing process according to claim 29, wherein the air compressor is coupled to the plurality of controllable air valves through a plurality of air lines, and further comprising:

at least one air dryer operable to reduce the amount of water in the plurality of air lines.

31. The automated system for monitoring and controlling the transfer of water during a hydraulic fracturing process according to claim 1, wherein the one or more controllers are selected from the group consisting of a programmable logic controller, a personal computer, a laptop computer, a notebook computer, a smartphone, and a tablet computer.

32. The automated system for monitoring and controlling the transfer of water during a hydraulic fracturing process according to claim 1, wherein the one or more controllers are operable to remotely control a valve opening position of one or more of the plurality of controllable valves based on one or more of the water levels in one or more of the plurality of frac water storage containers.

33. The automated system for monitoring and controlling the transfer of water during a hydraulic fracturing process according to claim 1, wherein the one or more controllers are operable to remotely control a valve opening position of the plurality of controllable valves based on a setpoint that is a desired water level in the plurality of frac water storage containers as determined at least partially by the plurality of level indicators.

34. The automated system for monitoring and controlling the transfer of water during a hydraulic fracturing process according to claim 33, wherein the desired water level correlates to a volume.

35. The automated system for monitoring and controlling the transfer of water during a hydraulic fracturing process according to claim 1, wherein the one or more controllers are operable to remotely control a valve opening position of a first one of the plurality of controllable valves based on a first setpoint of the water level in a first one of the plurality of frac water storage containers that is in fluid communication with the first one of the plurality of controllable valves, and wherein the one or more controllers are operable to remotely control a valve opening position of a second one of the plurality of controllable valves based on a second setpoint of the water level in a second one of the plurality of frac water storage containers that is in fluid communication with the second one of the plurality of controllable valves.

36. The automated system for monitoring and controlling the transfer of water during a hydraulic fracturing process according to claim 35, wherein the first setpoint is different from the second setpoint.

37. The automated system for monitoring and controlling the transfer of water during a hydraulic fracturing process according to claim 1, wherein the plurality of controllable valves are manually controlled and are manually set to a desired valve opening position.

38. The automated system for monitoring and controlling the transfer of water during a hydraulic fracturing process according to claim 1, wherein the plurality of frac water storage containers are in fluid communication with one another.

39. The automated system for monitoring and controlling the transfer of water during a hydraulic fracturing process according to claim 1, wherein the one or more controllers are configured to generate an alarm if certain predetermined values are met selected from the group consisting of a line pressure related to the first manifold, the flow of water into the first manifold, and the water level in one or more of the plurality of frac water storage containers, and wherein the alarm includes one or more selected from the group consisting of an audible alarm, a blinking display, and a color change on the display.

40. The automated system for monitoring and controlling the transfer of water during a hydraulic fracturing process according to claim 1, wherein the one or more controllers are configured to be remotely accessed through one or more selected from the group consisting of the Internet, a data network, a virtual private network, a wired network, a wireless network, a secure data network, and a satellite communications network.

41. The automated system for monitoring and controlling the transfer of water during a hydraulic fracturing process according to claim 1, further comprising:
one or more sensors operable to access the water and to measure one or more values selected from the group consisting of a water pressure, line pressure, a pH, a temperature, a frac water storage container pressure, a frac water storage container pH, and a frac water storage container temperature, and wherein the one or more controllers are operable to receive such values and display such values at the one or more displays, and to store such values at the storage device.

42. An automated system implemented in a mobile container for monitoring and controlling the transfer of water from a first water source and water from a second water source to a plurality of frac water storage containers for use during a hydraulic fracturing process, the automated system comprising:
a first manifold configured to receive water from the first water source through at least one input, and to supply water to a plurality of output openings for use in the hydraulic fracturing process;
a plurality of controllable valves, wherein each of the plurality of controllable valves is configured to be in fluid communication between an input to one of the plurality of frac water storage containers and with one of the plurality of output openings of the first manifold;
a second manifold operable to receive water from the second water source through at least one input, and to supply water from the second water source to a plurality of output openings of the second manifold;
a second plurality of controllable valves, wherein each of the second plurality of controllable valves is configured to be in fluid communication between an input to one of the plurality of frac water storage containers and with one of the plurality of output openings of the second manifold;
one or more controllers configured to at least partially control the operation of at least a first pump to allow water from the first water source to be pumped into the first manifold, and wherein the one or more controllers are in communication with the plurality of controllable valves and are configured to control the opening and closing of each of the plurality of controllable valves to a desired opening position so that water from the first water source in the first manifold may be provided to each of the plurality of frac water storage containers through the plurality of output openings of the first manifold based at least partially on a water level of the plurality of frac water storage containers determined by an associated plurality of level indicators, wherein the one or more controllers are further configured to at least partially control the operation of a second pump to allow water from the second water source to be pumped into the second manifold, and wherein the one or more controllers are in communication with the second plurality of controllable valves and are configured to control the opening and closing of each of the second plurality of controllable valves to a desired opening position so that water from the second water source in the second manifold may be provided to each of the plurality of frac water storage containers through the plurality of output openings of the second manifold based at least partially on the water level of the plurality of frac water storage containers determined by the associated plurality of level indicators;
one or more displays operable to receive and display information that includes the water level of one or more of the plurality of frac water storage containers as determined at least partially by one or more selected from the group consisting of the plurality of level indicators, the valve opening positions of one or more of the plurality of controllable valves and one or more of the second plurality of controllable valves, the flow of water into the first manifold, the flow of water into the second manifold, and operating information of the first pump and the second pump; and a storage device configured to receive and store information that includes two or more selected from the group consisting of the water level of one or more of the plurality of frac water storage containers, a water volume level of one or more of the plurality of frac water storage containers, the valve opening positions of one or more of the plurality of controllable valves and one or more of the second plurality of controllable valves, operating information of the first pump, operating information of the second pump, and the flow of water into the first manifold and the second manifold.

43. The automated system implemented in a mobile container for monitoring and controlling the transfer of water from the first water source and water from the second water source to the plurality of frac water storage containers for use during a hydraulic fracturing process according to claim 42, wherein the mobile container is selected from the group consisting of an open trailer, a skid configured to reside on a trailer, a shipping container, a cargo trailer, and an environmentally controlled at least partially closed trailer.

44. The automated system implemented in a mobile container for monitoring and controlling the transfer of water from the first water source and water from the second water source to the plurality of frac water storage containers for use during a hydraulic fracturing process according to claim 42, further comprising:
  an air compressor operable to open and close the plurality of controllable valves and the second plurality of controllable valves during the hydraulic fracturing process; and
  a generator operable to provide power to one or more of the one or more controllers, one or more displays, the storage device, the plurality of controllable valves, and the second plurality of controllable valves.

45. The automated system implemented in a mobile container for monitoring and controlling the transfer of water from the first water source and water from the second water source to the plurality of frac water storage containers for use during a hydraulic fracturing process according to claim 42, wherein the plurality of controllable valves and the second plurality of controllable valves include one or more selected from the group consisting of an air controlled valve, a pneumatically controlled valve, and an electrical actuator controlled valve.

46. A method of operating an automated system for monitoring and controlling the transfer of water from a first water source to a plurality of frac water storage containers during a hydraulic fracturing process, wherein the automated system for monitoring and controlling the transfer of water during a hydraulic fracturing process includes:
  a first manifold operable to receive water from the first water source through at least one input, and to supply water to a plurality of output openings for use in the hydraulic fracturing process;
  a plurality of controllable valves, wherein each of the plurality of controllable valves is configured to be in fluid communication between an input to one of the plurality of frac water storage containers and with one of the plurality of output openings of the first manifold;
  a plurality of level indicators, wherein each of the plurality of level indicators are configured to one of the plurality of frac water storage containers to determine a water level at each such one of the plurality of frac water storage containers;
  a first flow meter configured to measure a flow of water into the first manifold;
  a first pump configured to be remotely operated, to receive water from the first water source, and to pump water through a discharge to the at least one input of the first manifold with the plurality of output openings;
  one or more controllers configured to at least partially control the operation of the first pump to allow water to be pumped into the first manifold, and wherein the one or more controllers are in communication with the plurality of controllable valves and are configured to control the opening and closing of each of the plurality of controllable valves to a desired opening position so that water from the first water source in the first manifold may be provided to each of the plurality of frac water storage containers through the plurality of output openings of the first manifold based at least partially on the water level of the plurality of frac water storage containers determined by the associated plurality of level indicators;
  one or more displays operable to receive and display information that includes the water level of one or more of the plurality of frac water storage containers as determined at least partially by one or more selected from the group consisting of the plurality of level indicators, the valve opening positions of one or more of the plurality of controllable valves, the flow of water into the first manifold, and operating information of the first pump; and
  a storage device configured to receive and store information that includes two or more selected from the group consisting of the water level of one or more of the plurality of frac water storage containers as determined at least partially by one or more of the plurality of level indicators, a water volume level of one or more of the plurality of frac water storage containers as determined at least partially by one or more of the plurality of level indicators, the valve opening positions of one or more of the plurality of controllable valves, operating information of the first pump, and the flow of water into the manifold from the first flow meter;
  wherein the method of operating the automated system comprises:
  placing one or more of the plurality of controllable valves into a control mode to control the openings of such controllable valves based at least partially on the water level of the plurality of frac water storage containers, and the control mode includes a control mode selected from the group consisting of an automatic mode, a manual mode, a gang control mode, an individual control mode, and a remote manual control mode.

47. The method according to claim 46, wherein the gang control mode includes a single setpoint for all of the one or more of the plurality of controllable valves in the gang control mode, and the single setpoint is related to a water level in the corresponding frac water storage containers associated with each one or more of the plurality of controllable valves, wherein the individual control mode includes a setpoint for each one of the one or more of plurality of controllable valves in the individual control mode, and the setpoint for each one of the one or more of plurality of controllable valves in the individual control mode is related to a water level in a corresponding frac water storage container associated with each one of the one or more of the plurality of controllable valves, and wherein the remote manual control mode allows one or more of the plurality of controllable valves to be remotely opened to a desired opening to allow water to flow to a corresponding water storage container associated with each one of the one or more of the plurality of controllable valves.

48. The method according to claim 46, wherein a first one or more of the plurality of controllable valves are in a first control mode, and a second one or more of the plurality of controllable valves are in a second control mode.

49. The method according to claim 46, wherein the automated system for monitoring and controlling the transfer of water during the hydraulic fracturing process further includes:
   a second flow meter configured to measure the flow of water from the discharge of the first pump;
   a second manifold operable to receive water from a second water source through at least one input, and to supply water from the second water source to a plurality of output openings of the second manifold;
   a second plurality of controllable valves, wherein each of the second plurality of controllable valves is configured to be in fluid communication between an input to one of the plurality of frac water storage containers and with one of the plurality of output openings of the second manifold;
   a third flow meter configured to measure a flow of water into the second manifold;
   a second pump configured to be remotely operated, to receive water from the second water source, and to pump water through a discharge to the input of the second manifold with the plurality of output openings of the second manifold;
   a fourth flow meter configured to measure the flow of water from the discharge of the second pump; and
   wherein the one or more controllers are further configured to at least partially control the operation of the second pump to allow water from the second water source to be pumped into the second manifold, and wherein the one or more controllers are in communication with the second plurality of controllable valves and are configured to control the opening and closing of each of the second plurality of controllable valves to a desired opening position so that water from the second water source in the second manifold may be provided to each of the plurality of frac water storage containers through the plurality of output openings of the second manifold based at least partially on the water level of the plurality of frac water storage containers determined by the associated plurality of level indicators;
   wherein the method of operating the automated system further comprises:
   placing all or some of the plurality of controllable valves into an automatic mode or a manual mode to provide water from the first water source to the plurality of frac water storage containers, and placing all or some of the second plurality of controllable valves into an automatic mode or a manual mode to provide water from the second water source to the plurality of frac water storage containers.

50. The method according to claim 49, wherein the method of operating the automated system further comprises:
   remotely adjusting the flow rate of the water from the first water source by adjusting an rpm level of the first pump by selecting the desired rpm level using the one or more displays and the one or more controllers; and
   remotely adjusting the flow rate of the water from the second water source by adjusting an rpm level of the second pump by selecting the desired rpm level using the one or more displays and the one or more controllers, and wherein the water from the second water source includes one or more selected from the group consisting of impaired water, frac flowback water, and production water.

51. The method according to claim 50, wherein the method of operating the automated system further comprises:
   remotely closing the plurality of controllable valves and the second plurality of controllable valves using a kill switch by selecting the kill switch displayed on the one or more displays by the one or more controllers.

52. The method according to claim 49, further comprising:
   periodically storing information using the storage device while operating the automated system for monitoring and controlling the transfer of water during the hydraulic fracturing process, wherein the information includes one or more selected from the group consisting of the valve position of one or more of the plurality of controllable valves, the valve position of one or more of the second plurality of controllable valves, the water levels in the frac water storage containers, a first volume of water provided from the first water source, a second volume of water provided from the second water source, operational information associated with the first pump, and operational information associated with the second pump.

53. The method according to claim 49, further comprising:
   generating an alarm using the one or more controllers based on information while operating the automated system for monitoring and controlling the transfer of water during the hydraulic fracturing process, wherein the information includes one or more selected from the group consisting of the valve position of one or more of the plurality of controllable valves, the valve position of one or more of the second plurality of controllable valves, the water levels in the frac water storage containers, the flow rate of water provided from the first water source, the flow rate of water provided from the second water source, a first volume of water provided from the first water source, a second volume of water provided from the second water source, operational information associated with the first pump, and operational information associated with the second pump.

54. The method according to claim 46, further comprising:
   remotely accessing the one or more controllers through one or more selected from the group consisting of the Internet, a data network, a virtual private network, a wired network, a wireless network, a secure data network, and a satellite communications network.

* * * * *